United States Patent
Sharma et al.

(10) Patent No.: US 12,549,587 B2
(45) Date of Patent: Feb. 10, 2026

(54) CORRELATING OUTBOUND TRAFFIC AND FILE EVENTS WITH A CI/CD PIPELINE

(71) Applicant: Step Security, Inc., Sammamish, WA (US)

(72) Inventors: Varun Sharma, Sammamish, WA (US); Ashish Kurmi, Redmond, WA (US)

(73) Assignee: Step Security, Inc., Sammamish, WA (US)

( * ) Notice: Subject to any disclaimer, the term of this patent is extended or adjusted under 35 U.S.C. 154(b) by 109 days.

(21) Appl. No.: 18/424,765

(22) Filed: Jan. 27, 2024

(65) Prior Publication Data

US 2025/0247413 A1    Jul. 31, 2025

(51) Int. Cl.
  *H04L 9/40*    (2022.01)
(52) U.S. Cl.
  CPC ...... *H04L 63/1433* (2013.01); *H04L 63/1425* (2013.01); *H04L 63/306* (2013.01)
(58) Field of Classification Search
  CPC ............ H04L 63/1433; H04L 63/1425; H04L 63/306; H04L 63/145
  See application file for complete search history.

(56) References Cited

U.S. PATENT DOCUMENTS

| | | | |
|---|---|---|---|
| 2024/0069908 A1* | 2/2024 | Moraes | G06F 8/73 |
| 2024/0134979 A1* | 4/2024 | Kravtsov | G06F 21/577 |
| 2024/0411895 A1* | 12/2024 | Dubey | G06F 21/577 |
| 2025/0103721 A1* | 3/2025 | Singh | G06F 8/60 |
| 2025/0209171 A1* | 6/2025 | Barton | G06F 21/572 |
| 2025/0217480 A1* | 7/2025 | Trigano | G06F 21/552 |

* cited by examiner

*Primary Examiner* — Kostas J Katsikis
(74) *Attorney, Agent, or Firm* — Mahamedi IP Law LLP

(57) ABSTRACT

The disclosed system and process involve correlating outbound traffic with a CI/CD pipeline. CI/CD Pipelines consist of multiple jobs, and each job's steps execute on the same runner host. Network monitors relay information about domain names and network connections during job execution to the data store. Once all pipeline jobs are complete, the correlation server links domain names and connections to determine endpoints. This correlation, showing outbound traffic for each step, is accessible to the pipeline owner for review. An alert is triggered for new endpoints relative to the baseline. Owners can block unexpected endpoints based on explicitly defined lists. The correlation server also identifies file events, aiding in detecting suspicious file and software build overwrite events for combating software supply chain attacks. Observed file and network events contribute to generating a Software Bill of Materials (SBOM) through runtime events.

15 Claims, 18 Drawing Sheets

```
1    name: release
2    jobs:
3      test:
4        run-on: [macos-latest, ubuntu-latest]
5        steps:
6          - name: Checkout
7            uses: actions/checkout@v2
8          - name: Run tests
9            run: go test
10     release:
11       runs-on: ubuntu-latest
12       steps:
13         - name: Checkout
14           uses: actions/checkout@v2
15         - name: Build
16           run: go build -o ./main
17         - name: Copy file via SSH
18         - uses: ssh/scp-action@v1
19         - with:
20             host: 13.56.76.45
21             username: myuser
22             source: ./main
23             target: "destination/main"
24         - name: Deploy to AWS
25           run: aws s3 cp ./main s3://mys3/main
```

FIG. 1

| Pipeline Run ID | Job Run ID | IP Address | Port | Time Stamp |
|---|---|---|---|---|
| 206-23 | 208-23 | 108.45.34.67 | 443 | 2021-09-25 03:14:07 |
| 206-23 | 208-23 | 63.215.198.31 | 443 | 2021-09-25 03:14:39 |
| 206-23 | 208-23 | 13.56.76.45 | 22 | 2021-09-25 03:15:34 |
| 206-23 | 208-23 | 45.67.45.34 | 443 | 2021-09-24 03:16:56 |
| ○○○ | ○○○ | ○○○ | ○○○ | ○○○ |

FIG. 5

| Pipeline Run ID | Job Run ID | Domain Name | Direct IP Address | Port | Time Stamp |
|---|---|---|---|---|---|
| 206-23 | 208-23 | api.github.com | | 443 | 2021-09-25 03:14:07 |
| 206-23 | 208-23 | proxy.golang.org | | 443 | 2021-09-25 03:14:39 |
| 206-23 | 208-23 | | 13.56.76.45 | 22 | 2021-09-25 03:15:34 |
| 206-23 | 208-23 | s3.amazon.com | | 443 | 2021-09-24 03:16:56 |
| ○○○ | ○○○ | ○○○ | | ○○○ | ○○○ |

FIG. 6

| | Pipeline Run ID | Job Run ID | Step | Start Time | Time Stamp |
|---|---|---|---|---|---|
| 702 | 206-23 | 208-23 | Step-1 | 2021-09-25 03:14:05 | 2021-09-25 03:14:37 |
| 704 | 206-23 | 208-23 | Step-2 | 2021-09-25 03:14:37 | 2021-09-25 03:15:30 |
| 706 | 206-23 | 208-23 | Step-3 | 2021-09-25 03:15:30 | 2021-09-25 03:16:30 |
| 708 | 206-23 | 208-23 | Step-4 | 2021-09-25 03:16:30 | 2021-09-25 03:17:02 |
| | ○○○ | ○○○ | ○○○ | ○○○ | ○○○ |

FIG. 7

| | Pipeline Run ID | Job Run ID | Step | Domain Name | Direct IP Address | Port | Time Stamp |
|---|---|---|---|---|---|---|---|
| 802 | 206-23 | 208-23 | Step-1 | api.github.com | | 443 | 2021-09-25 03:14:07 |
| 804 | 206-23 | 208-23 | Step-2 | proxy.golang.org | | 443 | 2021-09-25 03:14:39 |
| 806 | 206-23 | 208-23 | Step-3 | | 13.56.76.45 | 22 | 2021-09-25 03:15:34 |
| 808 | 206-23 | 208-23 | Step-4 | s3.amazon.com | | 443 | 2021-09-24 03:16:56 |
| | ○○○ | ○○○ | ○○○ | ○○○ | ○○○ | ○○○ | ○○○ |

FIG. 8

| | Pipeline | Job | Step | Domain Name | Direct IP Address | Port |
|---|---|---|---|---|---|---|
| 902 | 206-23 | 208-23 | Step-1 | api.github.com | | 443 |
| 904 | 206-23 | 208-23 | Step-2 | proxy.golang.org | | 443 |
| 906 | 206-23 | 208-23 | Step-3 | | 13.56.76.45 | 22 |
| 908 | 206-23 | 208-23 | Step-4 | s3.amazon.com | | 443 |
| | ○○○ | ○○○ | ○○○ | ○○○ | ○○○ | ○○○ |

FIG. 9

CORRELATING OUTBOUND TRAFFIC AND FILE EVENTS WITH A CI/CD PIPELINE

TECHNICAL FIELD

The present disclosure relates generally to correlating outbound traffic and file events with a CI/CD pipeline.

BACKGROUND

Software supply chain attacks are on the rise. In such attacks, software used in the CI/CD pipeline, or the software installed on the CI/CD runner host is altered to exfiltrate pipeline secrets, steal proprietary source code or maliciously tamper the software build produced in CI/CD.

Currently, there are several solutions for detecting outbound network calls to malicious domain names or IP addresses. Some of these solutions attempt to use a list of known bad domain names/IP addresses, but these solutions fail to meet the needs of the industry because this list is not complete or comprehensive and needs to be updated continuously.

Other solutions allow users to configure a firewall to only allow a set of known good domain names or IP addresses, but these solutions are unable to meet the needs of the industry because it is hard to know what domains or IP addresses should be allowed when a pipeline is run. Users have neither the patience nor discipline to find out what domains/IP addresses need to be called by different steps of the pipeline. Some steps may download other components that then make more outbound calls, and it is hard to know or guess all the domain names/IP addresses needed.

Still, other solutions execute computer programs to see what domains names/IP addresses are called by the program to evaluate if the program is malicious, but these solutions also fail to meet industry needs because they do not correlate outbound domain names and IP addresses with a pipeline or each step of a pipeline to establish a baseline of allowed domain names and IP addresses for that pipeline and use it to alert the administrator about new domain names and/or IP addresses called in a pipeline run.

Further, current Software Bill of Materials (SBOM) solutions rely on software dependency manifest and lock files in source code (e.g., go.sum and go.mod files for Golang software projects) or analyze the software artifacts once it has been produced (e.g., npm software packages). Both solutions fail to meet industry needs since they provide incomplete information. When a tool analyzes the dependency manifest files, it may not know the exact version of a dependency as many language ecosystems provide the ability to specify a range of versions in these dependency files and exact version to be used is determined at the time of software build in CI/CD. When a tool analyzes a software binary after it has been built, software produced by many compiled languages such as Golang and C#.net do not provide any details about the software dependencies included in the software.

Further, a few patent references related to cybersecurity are discussed as follows.

U.S. Pat. No. 11,151,024 of Jinho Hwang et al. entitled "dynamic automation of DevOps pipeline vulnerability detecting and testing" discloses an artificial intelligence (AI) platform to support a continuous integration and deployment pipeline for software development and operations (DevOps). One or more running processes are subject to monitoring to identify presence of vulnerabilities. An automated rebuild of the monitored processes is initiated, which includes constructing a map representing a relationship of test code elements corresponding to different portions of source code. The identified vulnerable source code reflected in a new container image is subject to an automatic verification to ascertain if the source code is covered by at least one of the represented test code elements. A risk assessment is employed as part of the verification. A new container image is selectively deployed responsive to the risk assessment.

US20220329616 of Peter W. O'hearn et al. entitled "using static analysis for vulnerability detection" discloses a method of using static analysis for vulnerability detection. The method comprising steps of: inspecting, using an under-approximate static code analysis, a non-executable representation of an application to identify one or more vulnerabilities in the application, and providing an indication of the one or more vulnerabilities. The discussed references are focused on performing traditional cybersecurity tasks such as vulnerability management and vulnerability patching in application source code being analyzed/built in CI/CD. However, they do not fully address certain specific issues outlined in the context of the above discussed scenario.

Thus, there is a long-felt need in the art for a solution to attacks like these to avoid critical supply chain disruption. The disclosure herein provides solutions for this problem plaguing the art, as will become apparent from the specification, claims, figures, and disclosure.

SUMMARY

In the arrangement shown, as one example, a solution to complex problems, is provided. The inventors recognized the desirability of having a network monitor that automatically contextualizes outbound traffic with a CI/CD pipeline run. This includes correlating outbound traffic for a CI/CD pipeline run with each step of a pipeline.

Further, the inventors recognized the desirability of having the system and software to establish a baseline for the outbound traffic of the pipeline based on previously called endpoints ({domain name, port} and {direct IP address, port} pairs) accepted as valid by the owner of the pipeline. The baseline is created for: 1. Each CI/CD pipeline 2. Each step within a given CI/CD pipeline. In addition, by analyzing outbound traffic data for multiple runs by multiple CI/CD pipelines, a baseline is established for common CI/CD steps that are used across multiple CI/CD pipelines.

Still further, the inventors recognized the desirability of having a system and software that alerts the owner of the pipeline whenever a step in the pipeline attempts outbound calls to endpoints not in the previously established baseline. The disclosed system and associated software advantageously fill these needs by providing a network monitor to correlate outbound traffic with each step of a pipeline.

Furthermore, the inventors recognized the desirability of having a system and software that allows the owner of the pipeline block unexpected outbound traffic by explicitly defining the list of allowed endpoints for a pipeline based on the endpoints observed during past pipeline runs.

Still Further, the inventors recognized the desirability of having a system and software that can generate Software Bill of Materials (SBOM) for a software build produced in CI/CD by leveraging runtime file and network events it observes during the software build process.

In the arrangement shown, as one example, a system together with an associated computer process is presented. Embodiments include the following components: CI/CD server, plurality of runner hosts, plurality of network monitors, a correlation server, and a data store. These components are connected as follows: A plurality of runner hosts is connected to the network via a plurality of network monitors, with a 1:1 mapping between a runner host and a network monitor. Each runner host connects to the CI/CD server to check if there is a new job, that is ready to run and that it can execute, and if there is, the runner host downloads the job and executes it. Network monitors send information about domain names resolved and outbound network connections {destination IP address, destination port} opened during the run of the job to the data store. Once all the jobs in a pipeline run are complete, a correlation server fetches the data about the job run for each job in the pipeline from the data store and calculates a list of endpoints called by each step of the pipeline run. The associated computer process is made up of the following executable steps, all of which are required in all versions: a message is received by the correlation server that a pipeline run has completed. In some embodiments, the correlation server checks with the CI/CD server periodically if a pipeline has completed. In the next step, for each of the jobs in the pipeline, the process fetches the domain names called and the IP addresses they were resolved to, and the outbound network connections {destination IP address and destination port} opened during the job run from the data store. For each of the IP address to which a connection was opened, the process checks if the IP address is one that was resolved for a domain name. If yes, it adds the {domain name, port} to list of endpoints for the job run. If not, it adds the {IP address, port} to the list of direct IP address endpoints for that job run. Repeating this step for each IP address to which a connection was opened, the process calculates a list of unique endpoints ({domain name, port} and {direct IP address, port} pairs) to which a connection was opened and the timestamp when the connection was established. Process next retrieves information about the steps that were run, with the start and end times of each step in each job of the pipeline run. Process checks what step was running when a connection was established for each of the connections that were established during the pipeline run. This automatic correlation of outbound traffic with each step of a pipeline run is then available for review by the owner of the pipeline.

The system may also have one or more of the following optional components: a source control, which is connected to the network and stores a plurality of pipelines. Pipelines are implemented in code and typically checked into source control. The (CI/CD) server checks out (downloads) a pipeline, from the version control system as part of the build process and then proceeds to orchestrate the execution of the pipeline.

Furthermore, the runner hosts are setup, so they only run services that are needed for the running of the job, so no unnecessary outbound traffic originates from the runner host. In some embodiments, the runner application or another application on the runner or the first step of the job may stop services not needed for the job to run.

Furthermore, the associated computerized process may also have one or more of the following optional executable steps: After each pipeline run, all outbound connections established during the run are correlated to each step in the pipeline. If there are new endpoints found for any of the steps relative to the baseline for the pipeline, the owner of the pipeline is alerted about the new endpoints and asked to validate them. The endpoints deemed valid/expected by the owner are added to the baseline for the step in the pipeline. In addition, all file events observed during the run are correlated to each step in the pipeline. If the system detects a suspicious source code or software build overwrite events, the owner is notified. If the pipeline produced a software build, the system produces an SBOM during the runtime file and network events observed.

The disclosed system is unique when compared with other known systems and solutions in that it can be used to automatically discover and document outbound network connections established during each step of a pipeline run. Similarly, the software disclosed is unique when compared with other known solutions in that it correlates outbound traffic during the run of a pipeline to discover endpoints called and correlates the time that each connection was established with the start and end times of each step to associate an outbound connection with a step of a pipeline run. Furthermore, the software alerts the administrator when new endpoints are called during execution of a pipeline run relative to the baseline for each step of the pipeline, and updates the baseline based on the endpoints deemed valid by the owner of the pipeline. In addition, the disclosed system can generate SBOM using runtime events instead of by just analyzing dependency manifest files or the generated software build.

The disclosed system is superior to other systems because it provides automatic discovery of endpoints ({domain name, port} and {direct IP address, port} pairs) called during each step of a pipeline. To accomplish this, a network monitor is connected to each runner host and is initialized with the identifier of the job run and the pipeline run, just before or after the job starts to run on the runner host. The network monitor monitors the outbound traffic during the run of the job and sends information about domain names resolved, endpoints (IP address, port pairs) called, and the time each connection was established, during the execution of the job to the data store. Because each monitor is connected to a single runner host, the runner host only executes one job at a time, and each step of the job runs in sequence and the start and end time of each step is known because of pipeline run logs and other metadata related to the pipeline run, outbound traffic is correlated accurately for each step of each job of the pipeline run. Because a separate correlation server correlates the endpoints called for each job of the pipeline, it can correlate the endpoints, even though each job may have run on a separate runner host.

The disclosed system is superior to other systems because it provides automatic discovery of file events performed by each step of a pipeline. To accomplish this, a file monitor is connected to each runner host and is initialized with the identifier of the job run and the pipeline run, just before or after the job starts to run on the runner host. The file monitor monitors the file events during the run of the job and sends information about file operations performed (file name, full file path, file mode-read/write, process id and process name), and the time each connection was established, during the execution of the job to the data store. Because each monitor is connected to a single runner host, the runner host only executes one job at a time, and each step of the job runs in sequence and the start and end time of each step is known because of pipeline run logs and other metadata related to the pipeline run, file events are correlated accurately for each step of each job of the pipeline run. Because a separate correlation server correlates the file events called for each job of the pipeline, it can correlate the file events, even though each job may have run on a separate runner host.

Furthermore, the system establishes a baseline for outbound traffic for each step in the pipeline based on the endpoints called by the step that are accepted as being valid by the owner of the pipeline. To accomplish this, the system alerts the owner when new endpoints are called by step in a pipeline run, relative to the current baseline, asks the owner to accept each of them as valid, and updates the baseline endpoints for the pipeline with the valid endpoints.

In one embodiment, the present invention discloses a contextualized runtime security system for safeguarding continuous integration (CI)/continuous deployment (CD) systems. The system comprises a plurality of interconnected nodes, and a continuous integration (CI)/continuous deployment (CD) server connected to the nodes. The nodes and server are configured to perform one or more operations including: receive runtime event data of one or more pipelines in a CI/CD environment, from the sensors; map each event with a respective step of respective pipeline; generate a Software Bill of Materials (SBOM) based on the identified third-party components utilized in runtime event data for pipelines generating software builds; identify historical CI/CD security attack patterns utilizing the received runtime event data; create a baseline of expected runtime behaviour and compare runtime behaviors of the runtime event data against the established baselines, and block deviations from anticipated runtime baselines derived from prior pipeline runs.

The runtime event data includes job run in the pipeline run. The operations further include: calculate a list of outbound endpoints called during the pipeline run; receive information about steps executed for each of the job runs in the pipeline run; correlate the endpoints called during each job run of the pipeline run with each of the steps; compare the endpoints for each job run in the current pipeline run with baseline outbound endpoints for each job, and alert the owner of the pipeline, on determination of new endpoints relative to the baseline or if the baseline is empty.

The server is further enabled to modify endpoints to match for a different environment. The server is further configured to provide insights on runtime events before the pipeline run. The server is further enables to create a policy to block deviations from the expected runtime baseline derived using prior pipeline runs. The server is further configured to intercept and analyze outbound HTTP/HTTPS requests from pipelines. The server is further configured to confine outbound traffic to specific paths, verbs, or endpoints based on intercepted request details.

The present invention further discloses a method for safeguarding continuous integration (CI)/continuous deployment (CD) systems. The method is executed in a system comprising a plurality of interconnected nodes, and a continuous integration (CI)/continuous deployment (CD) server connected to the nodes. The method comprising the steps of: receiving runtime event data of one or more pipelines in a CI/CD environment, from one or more sensors; mapping each event with a respective step of respective pipeline; generating a Software Bill of Materials (SBOM) based on the identified third-party components utilized in runtime event data; identifying historical CI/CD security attack patterns utilizing the received runtime event data; creating a baseline of expected runtime behavior and compare runtime behaviors of the runtime event data against the established baselines, and blocking deviations from anticipated runtime baselines derived from prior pipeline runs. In another embodiment, if an owner has explicitly defined the list of allowed endpoints in the pipeline file, unexpected endpoints are blocked. In addition, the correlation server correlates file events established by each job run to calculate file events generated by each step. This information is used to detect suspicious file and software build overwrite events to detect software supply chain attacks. Observed file and outbound network events can be used by the system to generate Software Bill of Materials (SBOM) using runtime events.

The runtime event data includes job run in the pipeline run. The method further comprising steps of: calculating a list of outbound endpoints called during the pipeline run; receiving information about steps executed for each of the job runs in the pipeline run; correlating the endpoints called during each job run of the pipeline run with each of the steps; comparing the endpoints for each job run in the current pipeline run with baseline outbound endpoints for each job, and alerting the owner of the pipeline, on determination of new endpoints relative to the baseline or if the baseline is empty. The method further comprising the step of: enabling to modify endpoints to match for a different environment. The method further comprising the step of: providing insights on runtime events before the pipeline run. The method further comprising the step of: enabling to create a policy to block deviations from the expected runtime baseline derived using prior pipeline runs. The method further comprising the step of: intercepting and analyzing outbound HTTP/HTTPS requests from the pipelines. The method further comprising the step of: confining outbound traffic to specific paths, verbs, or endpoints based on intercepted request details.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Correlating outbound traffic with a pipeline may, however, be embodied in many different forms and should not be construed as being limited to the embodiments set forth herein; rather, these embodiments are provided by way of illustration only and so that this disclosure will be thorough, complete and fully convey understanding to those skilled in the art.

These and other objects, features, or advantages of the present disclosure will become more apparent from the specification and claims.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 is a diagram illustrating an example of a pipeline;

FIG. 5 is a diagram illustrating an embodiment of a network connection table in the data store;

FIG. 6 is a diagram illustrating an embodiment of an endpoints table for a pipeline run;

FIG. 7 is a diagram illustrating an embodiment of a steps table for a pipeline run;

FIG. 8 is a diagram illustrating an embodiment of a step endpoints table with outbound traffic correlated with each step of a pipeline run;

FIG. 9 is a diagram illustrating an embodiment of a baseline table with baseline endpoints for each step in a pipeline;

DETAILED DESCRIPTION OF EXAMPLE EMBODIMENTS

Figure 2A:
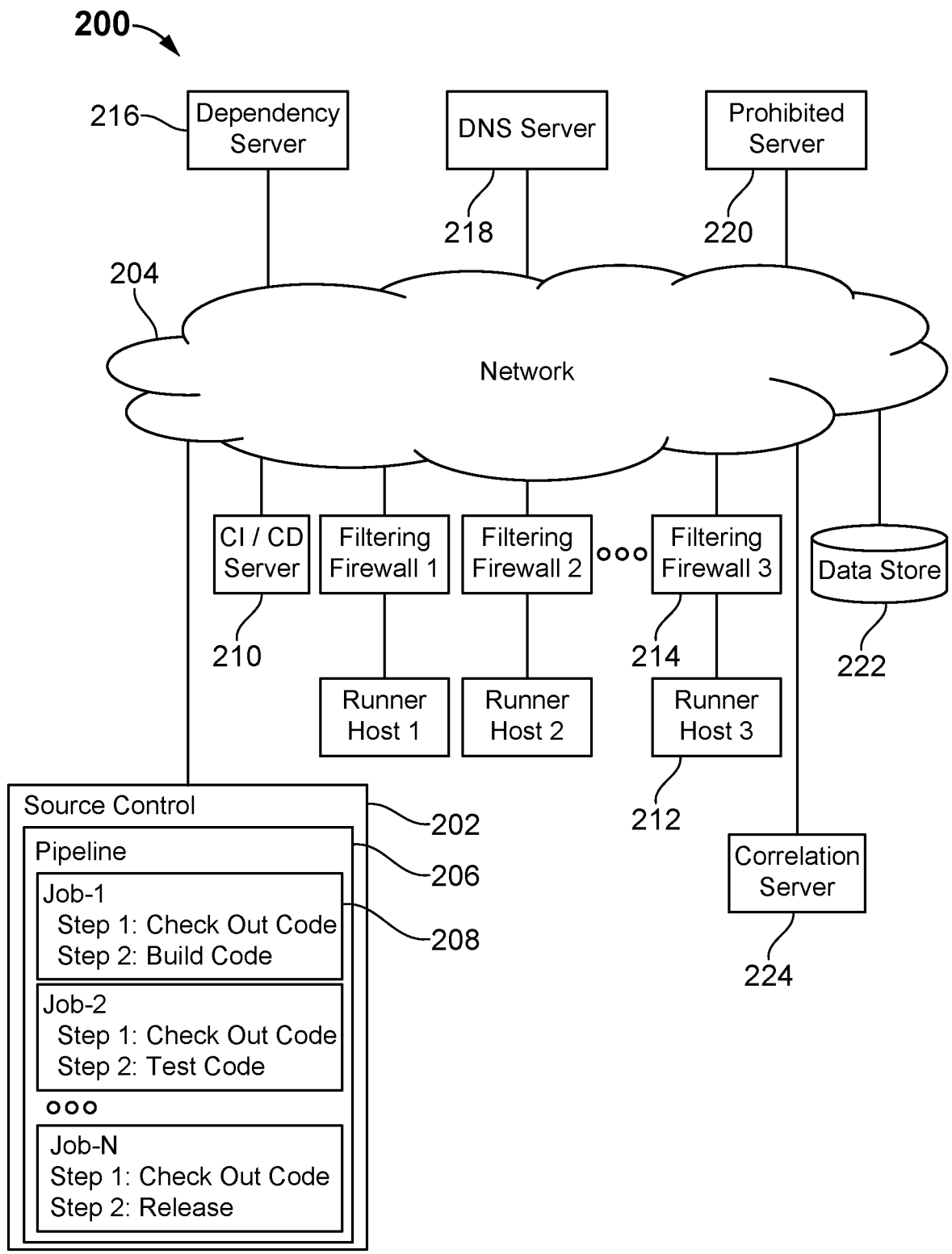
FIG. 2A is a diagram illustrating an embodiment of a system to automatically correlate outbound traffic for each step of a pipeline.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In the arrangement shown, as one example, a system is presented providing correlation of outbound traffic with a pipeline. Every change to software (committed in source control) goes through a complex process on its way to being released. A pipeline is an automated process that involves building the software in a reliable and repeatable manner, as well as progressing the built software (called a "build") through multiple stages of testing and deployment.

Pipelines are made up of one or more jobs. A step is an individual task that can run commands in a job. Pipelines are written in a text file and define these jobs and steps. These text files are typically stored in a source control repository. Each step in a job executes in sequence on the same runner host. Different jobs in a pipeline may run on different runner hosts.

FIG. 1 illustrates an example of a pipeline. It has 2 jobs-test and release. The definition for the job "test" starts at line 3. Line 4 specifies that the job "test" will run on a runner host with latest version of MacOS and another runner host with latest version of Ubuntu operating system. Lines 6-7 check out the source code, for which the job needs to connect to api.github.com at port 443. Line 8-9 runs automated tests on the downloaded source code. As part of this step, dependencies are fetched for which the job "test" will need to connect to golang.proxy.org at port 443. After step 9, the job run of the job "test" ends.

Line 10-25 is the specification for the job "release". Line 11 specifies that the job "release" will run on a runner host with latest version of Ubuntu operating system. Lines 13-14 check out the source code, for which the job needs to connect to api.github.com at port 443. Line 15-16 builds the source code. During the build step, the job downloads dependencies by connecting to proxy.golang.org at port 443. Lines 17-23 copy the build output to a host using SCP (secure copy protocol). The host is specified at line 20 using a direct IP address of 13.56.76.45. At line 25 the build output is copied to Amazon Simple Storage Service (S3), for which the job will need to connect to s3.amazon.com at port 443. After last step, the job run for the job "release" ends.

When job runs for both jobs "test" and "release" are complete, the pipeline run is complete.

FIG. 2A illustrates an embodiment of a system to automatically correlate outbound traffic for each step of a pipeline.

Figure 2B:
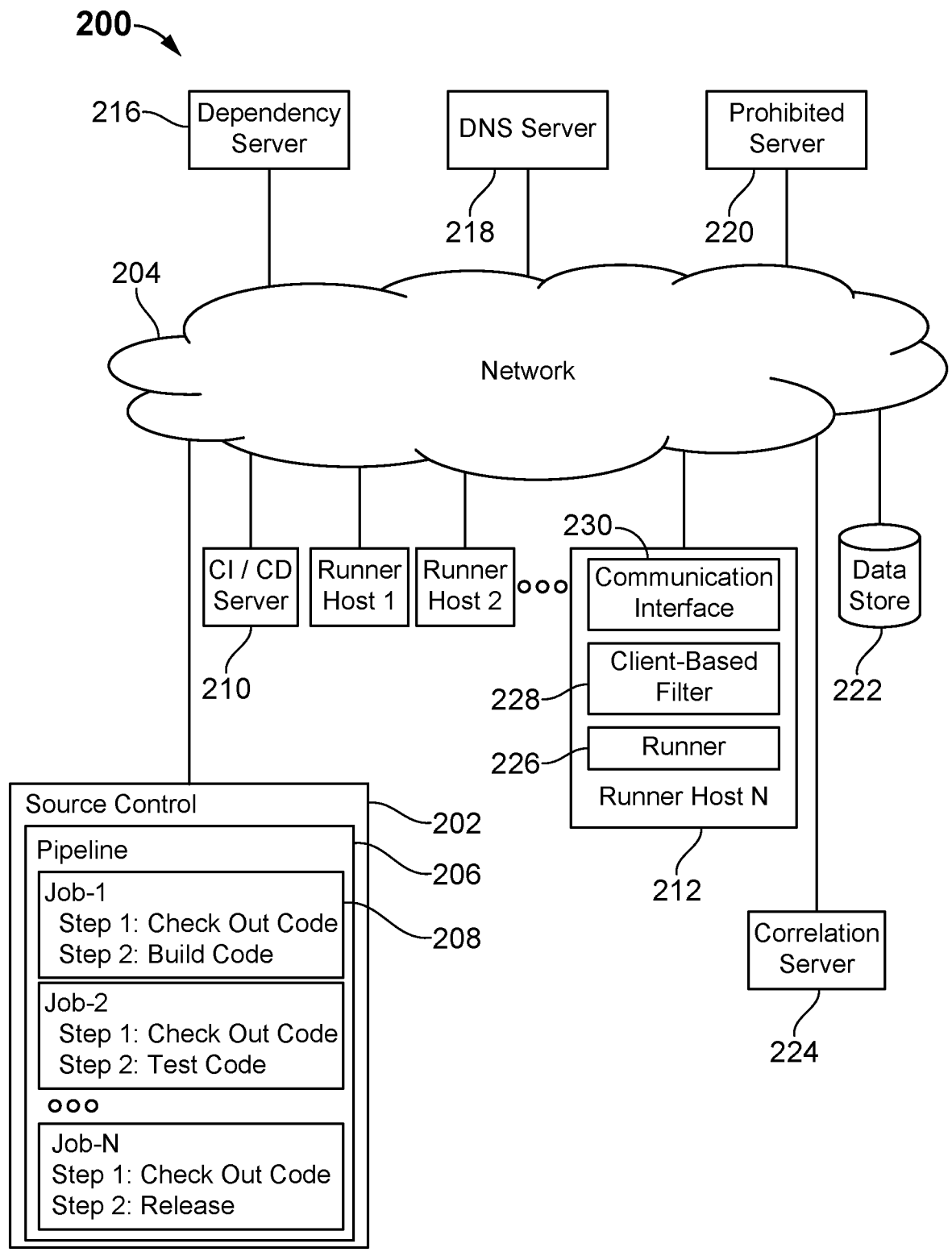
FIG. 2B is a diagram illustrating an embodiment of a system to automatically correlate outbound traffic for each step of a pipeline where the network monitor is a client-based monitor and is deployed on each runner host.

FIG. 2B illustrates an embodiment of a system to automatically correlate outbound traffic for each step of a pipeline where the network monitor is a client-based monitor and is deployed on each runner host, such as runner host 212. FIG. 2B parallels FIG. 2A except that in FIG. 2B some or all network monitoring technologies are deployed at each runner host.

Each of the hosts and servers referred to in this application can be general-purpose computers, such as desktop computers or cloud-based computing systems.

In FIGS. 2A and 2B, a source control system 202 is connected to the network 204 and stores a plurality of pipelines, such as pipeline 206. A pipeline 206 is made up of one or more jobs, such as job 208. FIG. 1 is an example of a pipeline, such as pipeline 206. Job "test" or "release" of FIG. 1 are examples of a job, such as job 208.

A Continuous Integration/Continuous Deployment (CI/CD) server 210, connected to the network 204, checks out (downloads) a pipeline, such as pipeline 206 from the source control 202 as part of the build process and then proceeds to orchestrate the execution of the pipeline. A plurality of runner hosts, such as runner host 212, are connected to the network 204 via a plurality of network monitors (such as network monitor 214 from FIG. 2A or client-based monitor 228 from FIG. 2B). Each Runner host is connected to a network monitor specific to that Runner host. Each runner host, such as runner host 212, connects to the CI/CD server 210 to check if there is a new job, such as job 208, that is ready to run and that it can execute (e.g., because the runner host has the appropriate operating system to run that type of job), and if there is, the runner host downloads the job and executes it. Runner host 212 is shown in FIG. 2B to include a runner application 226 that downloads a job, such as job 208 and runs it on the runner host.

Each run of a pipeline, such as pipeline 206 has a unique identifier, such as 206-23, a list of identifiers for the job runs, such as 208-23, for each job that is part of that pipeline, and a start, and an end time. Each run (execution) of a job, such as job 208, has a unique identifier, such as 208-23 and a start and an end time. Each step in the run of a job has a name, such as STEP-1, and a start and an end time. A pipeline run, such as 206-23 completes when all the job runs, such as 208-23, in the pipeline have completed. A plurality of DNS servers, such as DNS server 218 are connected to the network 204. The runner hosts, such as runner host 212, connect to a DNS server, such as DNS server 218 to resolve a domain name, such as proxy.golang.org to its IP address, before opening a connection to the IP address. A plurality of prohibited servers, such as prohibited server 220, are connected to the network 204. A prohibited server is a server that a runner host, such as runner host 212, has no need to connect to during the run of a job, such as job run 208-23 of job 208.

In addition, runner host 212 includes a communication interface 230 that enables communication with other hosts in the network such as the DNS server 218, the CI/CD server 210, and the data store 222. When a job, such has job 208 starts to run on a runner host 212, the network monitor (e.g., network monitor 214 of FIG. 2A or client-based monitor 228 of FIG. 2B) connected to that runner host is initialized with the identifier of the job run, such as 208-23, and the identifier of the pipeline run, such as 206-23.

When a job, such as job 208 executes on the runner host 212, it needs to access certain resources from the network, such as dependencies for the application being built. To download the dependency from a server such as from the dependency server 216, the job first resolves the domain portion of the URI into an IP address to open a network connection with a server associated with the domain/URI. The job uses the local name resolution functions provided by the operating system on the host to do this. If the operating system does not already know the IP address, it queries a remote DNS server (e.g., DNS server 218 of FIGS. 2A and 2B) by sending out a DNS request packet containing the name it wants to resolve (e.g., proxy.golang.org). Such a packet is sent out to a well-known port and usually to a well-known server. The corresponding response back to the host is also from a well-known port and contains the IP address registered for that domain name. Intercepting and recording the request to and response from the DNS server to learn the association between domain names and corresponding IP addresses is disclosed.

Figure 4A:
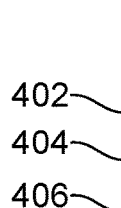
FIG. 4A is a diagram illustrating an embodiment of a DNS table in the data store.

The network monitor (e.g., network monitor 214 of FIG. 2A or client-based monitor 228 of FIG. 2B) is configured to monitor the request to and response from the DNS server, and send unique {domain name, resolved IP address} pairs, along with the identifier of the job run, such as 208-23, and the identifier of the pipeline run, such as 206-23, to the data store 222. DNS table of FIG. 4A shows an example of how {domain name, resolved IP address} pairs from a job run are stored in the data store 222.

Upon receiving a response from a DNS server, the runner host subsequently uses the received IP address to open a network connection. In some cases, the job running on the runner host may open a network connection to a direct IP address. A direct IP address is an IP address that a job connects to without resolving it from a DNS server. As an example, the command "ssh user@13.21.34.55" will cause a connection using the direct IP address 13.21.34.55.

The network monitor (e.g., network monitor 214 of FIG. 2A or client-based monitor 228 of FIG. 2B) is configured to monitor the destination IP address and destination port to which a connection is opened, and send {destination IP address, destination port} pairs along with the identifier of the job run, such as 208-23, the identifier of the pipeline run, such as 206-23, and timestamp of when the connection was opened to the data store 222. Network connections table of FIG. 5 shows an example of how {destination IP address, destination port} pairs from a job run are stored in the data store 222. Once a pipeline run, such as 206-23, is complete, the correlation server 224 fetches the data for each job run, such as 208-23, in the pipeline run from the data store 222 (from tables 4 and 5 of FIG. 4 and FIG. 5 respectively) and calculates the list of outbound endpoints ({domain name, port} and {direct IP address, port} pairs) called during the pipeline run. Endpoints table of FIG. 6 is an example of how this data is organized. This data structure may or may not be stored in the data store.

The correlation server 224 then gets information about the steps executed for each of the job runs in the pipeline run. This information can be fetched from the CI/CD server 210, example from the build logs. In some embodiments the runner application, or another application on the runner host, may store this information in the data store 222. The steps table of FIG. 7 shows an example of the steps that are executed in the job run, such as 208-23 in the pipeline run 206-23, and the start and end times for each of the steps.

The correlation server 224 correlates the endpoints called during each job run of the pipeline run (shown in endpoints table of FIG. 6) with each of the steps in the steps table of FIG. 7 to calculate the endpoints called by each step, such as STEP-1, in the pipeline run. The result of this automated correlation of outbound traffic for each step of the pipeline run is stored in the data store 222. An example of such a step endpoints table is shown in FIG. 8.

The correlation server 224 compares the endpoints for each job run, such as 208-23, in the current pipeline run, such as 206-23, with the baseline outbound endpoints for each job, such as job 208, in the pipeline, such as pipeline 206. If there are new endpoints relative to the baseline or if the baseline is empty, the correlation server 224 alerts the owner of the pipeline about the new endpoints called and asks the owner to verify if the endpoints are valid/expected. The endpoints deemed valid/expected are added to the baseline for the job 208 which is part of pipeline 206 and stored in the data store 222. Table of FIG. 9 shows an example of how baseline endpoints for a job 208 of pipeline 206 are stored in the data store 222. In some embodiments, during the validation step, the owner can modify endpoints to match for a different environment, e.g., production environment may use slightly different endpoints than a test environment.

Figure 3:
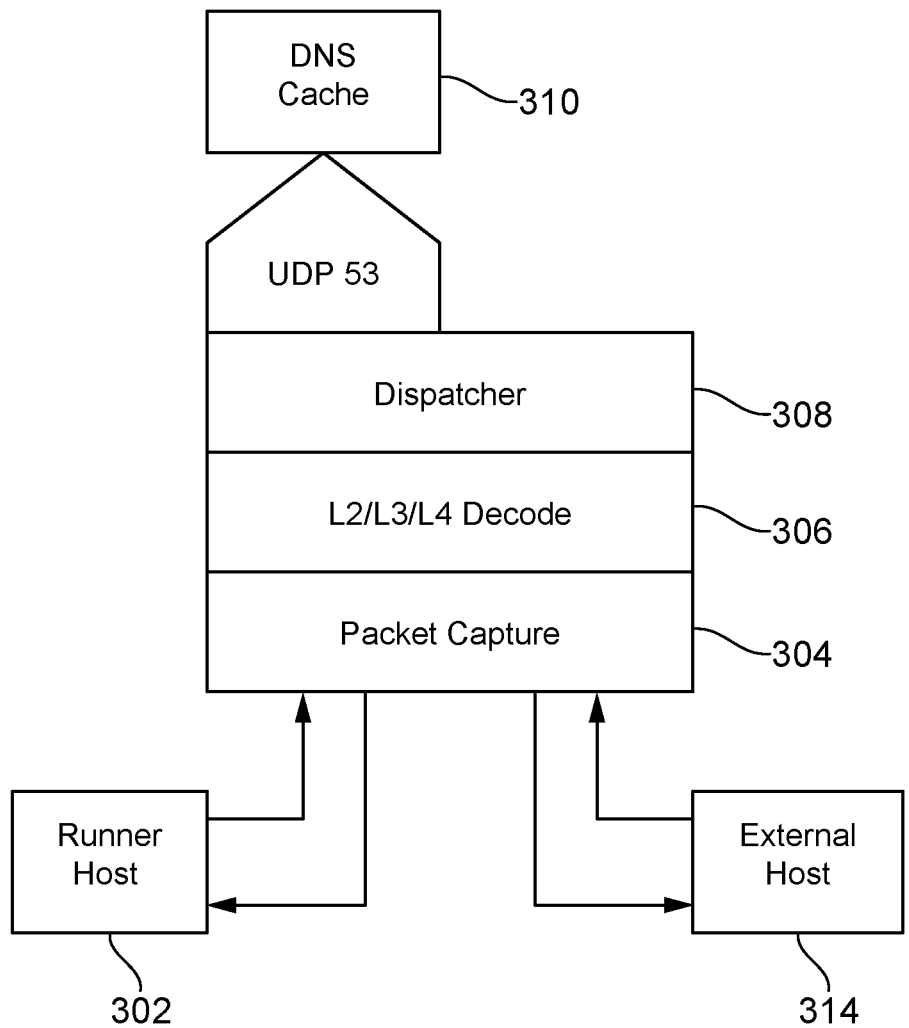
FIG. 3 is a diagram illustrating an embodiment of a network monitor configured to monitor network traffic during the run of a job in a pipeline.

FIG. 3 illustrates an embodiment of a network monitor configured to monitor outbound connections made during the run of a job in a pipeline. In some embodiments, the dispatcher 308 and DNS cache 310 are installed on each runner host 302.

In the embodiment shown, just before or after a job, such as job 208, starts to run, the dispatcher 308 and DNS cache 310 are initialized with an identifier of the job run, such as 208-23, and the identifier of the pipeline run, such as 206-23. After the job starts to execute, as part of its steps, the job needs to resolve domain names and connect to other hosts on the network. In the example shown in FIG. 3, a packet transmitted from a runner host, such as runner host 302, is captured at 304. The packet undergoes an L2/L3/L4 decode at 306, which includes the determination of the communication protocol, destination port, destination IP address, etc., of the packet.

If the packet comprises a request sent to a DNS server (e.g., destination port 53), the domain name associated with the DNS request is recorded in a local cache prior to being dispatched by dispatcher 308 to its destination, and a corresponding return transmission from a DNS server that is a response to the DNS request is awaited.

Bi-directional packet capture functionality is provided in the embodiment illustrated in FIG. 3. Thus, a packet transmitted from an external host, such as external host 314, into the internal network is captured at 304. The packet undergoes an L2/L3/L4 decode at 306 which includes the determination of the communication protocol and source port of the packet. If a packet corresponds to a DNS response (e.g., source port 53), the IP address in the DNS response is stored in the local cache along with the domain name that was previously captured. If this is the first time that the {domain name, IP address the domain was resolved to} pair is recorded in the DNS cache 310, the {domain name, IP address} pair is sent to the data store 222 along with the identifier of the job run, such as 208-23, and the identifier of the pipeline run, such as 206-23, to be stored in the DNS table (FIG. 4).

If the packet corresponds to a new connection, e.g. SYN packet of a TCP connection, the dispatcher 308 sends the destination IP address, destination port, the identifier of the job run 208-23, the identifier of the pipeline run 206-23, and the timestamp to the data store 222 to be stored in the network connections table (FIG. 5).

FIG. 4A illustrates an embodiment of a DNS table in the data store 222. In the example shown, for each unique domain name resolved during a job run, the identifier of the pipeline run, such as 206-23, is stored in the PIPELINE RUN ID column, the identifier of the job run, such as 208-23, is stored in the JOB RUN ID column, the domain name for which an IP address was requested in the DNS request is stored in the DOMAIN NAME column and the corresponding IP address associated with the domain name, as learned by intercepting a DNS response to the DNS request associated with the domain name, is stored in the RESOLVED IP ADDRESS column. In the example of the table provided in FIG. 4A, entry 402 of the DNS table, for example, specifies that during the pipeline run 206-23 of pipeline 206, the job 208, which is part of the pipeline 206 ran, and its job run was 208-23. During the job run 208-23, domain name api.github.com was resolved to IP address 108.45.34.67. Entry 406 of the DNS table, for example, specifies that during the same job run 208-23, domain name s3.amazon.com was resolved to IP address 45.67.45.34.

Figure 4B:
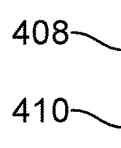
FIG. 4B is a diagram illustrating a table for storing file event during a CI/CD pipeline run.

FIG. 4B is a diagram illustrating a table for storing file event during a CI/CD pipeline run. In an example, the table specifies pipeline run ID, job run ID, file name, file type, file path, timestamp, and process. Entry 408 of the table, for example, specifies that during the pipeline run 206-23, the job 208, which is part of the pipeline run 206 and its job run was 208-23. During the job run 208-23, the file name, file type, file path, timestamp, process was main.go, source code,/home/runner, 2022 Sep. 25 03:14:07, and git, respectively. Entry 410 of the table, for example, specifies that during the pipeline run 206-23, the job 208, which is part of the pipeline run 206 and its job run was 208-23. During the job run 208-23, the file name, file type, file path, timestamp, process was utility.go, source code,/home/runner, 2022 Sep. 25 03:14:07, and git, respectively.

FIG. 5 illustrates an embodiment of a network connection table in the data store. In the example shown, for each IP address and port to which an outbound network connection is established during a job run, the identifier of the pipeline run, such as 206-23 is stored in the PIPELINE RUN ID column, the identifier of the job run, such as 208-23, is stored in the JOB RUN ID column, the destination IP address is stored in the IP ADDRESS column, the destination port is stored in the PORT column, and the time when the connection was initiated is stored in the TIMESTAMP column. In the example of the table provided in FIG. 5, entry 502 of the network connections table, for example, specifies that during the pipeline run 206-23 of pipeline 206, the job 208, which is part of the pipeline 206 ran, and its job run was 208-23. During the job run 208-23, network connection was established to IP address 108.45.34.67 and port 443 at 2021 Sep. 25 03:14:07.

FIG. 6 illustrates an embodiment of an endpoints table for a pipeline run. By correlating entries in network connections table of FIG. 5 with entries in DNS table of FIG. 4, for each IP address and port to which an outbound network connection was established during a job run, the identifier of the pipeline run, such as 206-23 is stored in the PIPELINE RUN ID column, the identifier of the job run, such as 208-23, is stored in the JOB RUN ID column, if the IP address is found in the DNS table for the job run, the corresponding domain name is stored in the DOMAIN NAME column, if the IP address was not found in the DNS table for the job run, the IP address is stored in the DIRECT IP ADDRESS column. The port and timestamp from table of FIG. 5 are copied over as in column PORT and TIMESTAMP in the endpoints table of FIG. 6. In the example of the table provided in FIG. 6, entry 602, for example, specifies that during the pipeline run 206-23, and as part of that pipeline run, during the job run 208-23, domain name api.github.com was connected to at port 443 at 2021 Sep. 25 03:14:07. Since the IP address of 108.45.34.67 in entry 502 of the network connections table of FIG. 5 was found as a resolved IP address in entry 402 with domain name api.github.com in table of FIG. 4, it was added to table of FIG. 6 as a domain name in entry 602. In the example of the table provided in FIG. 6, entry 604, for example, specifies that during the pipeline run 206-23, and as part of that pipeline run, during the job run 208-23, the direct IP address 13.56.76.45 was connected to at port 22 at 2021 Sep. 25 03:15:34. Since the IP address of 13.56.76.45 in entry 504 of the network connections table of FIG. 5 was not found as a resolved IP address for job run 208-23 in table of FIG. 4, it was added to table of FIG. 6 as a direct IP address in entry 604.

FIG. 7 illustrates an embodiment of a steps table for a pipeline run. In the example shown, for each step that ran in each job in a pipeline run, the identifier of the pipeline run, such as 206-23 is stored in the PIPELINE RUN ID column, the identifier of the job run 208-23 is stored in the JOB RUN ID column, the name of the step, such as STEP-1 is stored in the STEP NAME column, and the start and end times for the step are stored in the START TIME and END TIME columns respectively. In the example of the table provided in FIG. 7, entry 702, for example, specifies that during the pipeline run 206-23, and as part of that pipeline run, during the job run 208-23, STEP-1 was the first step to run, and that it started at 2021 Sep. 25 03:14:05 and completed at 2021 Sep. 25 03:14:37.

FIG. 8 illustrates an embodiment of a step endpoints table with outbound traffic correlated with each step of a pipeline run. In the example shown, for each network connection that was established in each job in a pipeline run, the identifier of the pipeline run, such as 206-23 is stored in the PIPELINE RUN ID column, the identifier of the job run 208-23 is stored in the JOB RUN ID column, the name of the step that was running when the connection was established is stored in the STEP NAME column, the domain name of endpoint connected to is in the DOMAIN NAME column, if the step connected to a direct IP address, that direct IP address is in the DIRECT IP ADDRESS column, the destination port to which connection was made is in the PORT column, and the time at which the connection was made is in the TIMESTAMP column. By correlating the entry 702 from the step table of FIG. 7 with entry 602 of the endpoints table of FIG. 6, entry 802 of FIG. 8 specifies that during the pipeline run 206-23, and as part of that pipeline run, during the job run 208-23, STEP-1 initiated a connection to endpoint with domain name api.github.com at port 443 at 2021 Sep. 25 03:14:07. This is because time 2021 Sep. 25 03:14:07 is between the start and end times for the step STEP-1 as per entry 702 of the table in FIG. 7, and since there was no other process running on the runner host at that time, other than the STEP-1 of job run 208-23, the connection is attributed to STEP-1.

FIG. 9 illustrates an embodiment of a table with baseline endpoints for each step of each job in a pipeline. In the example shown, for each outbound endpoint ({domain name, port} and {direct IP address, port} pair) considered valid as per the owner of the pipeline, the identifier of the pipeline 206 is stored in the PIPELINE column, identifier of the job, such as 208, is stored in the JOB column, the step that is expected to make the connection is stored in the STEP NAME column, the domain name to which connection is expected is stored in the DOMAIN NAME column, if the endpoint is of type direct IP address, the direct IP address to which connection is expected is stored in the DIRECT IP ADDRESS column, and the port to which connection is expected is in the PORT column. In the example of the table provided in FIG. 9, entry 902 specifies that for pipeline 206, job 208, STEP-1 is expected to call endpoint api.github.com at port 443 and this has been validated by the owner of the pipeline and is part of the baseline for pipeline 206.

Figure 10A:
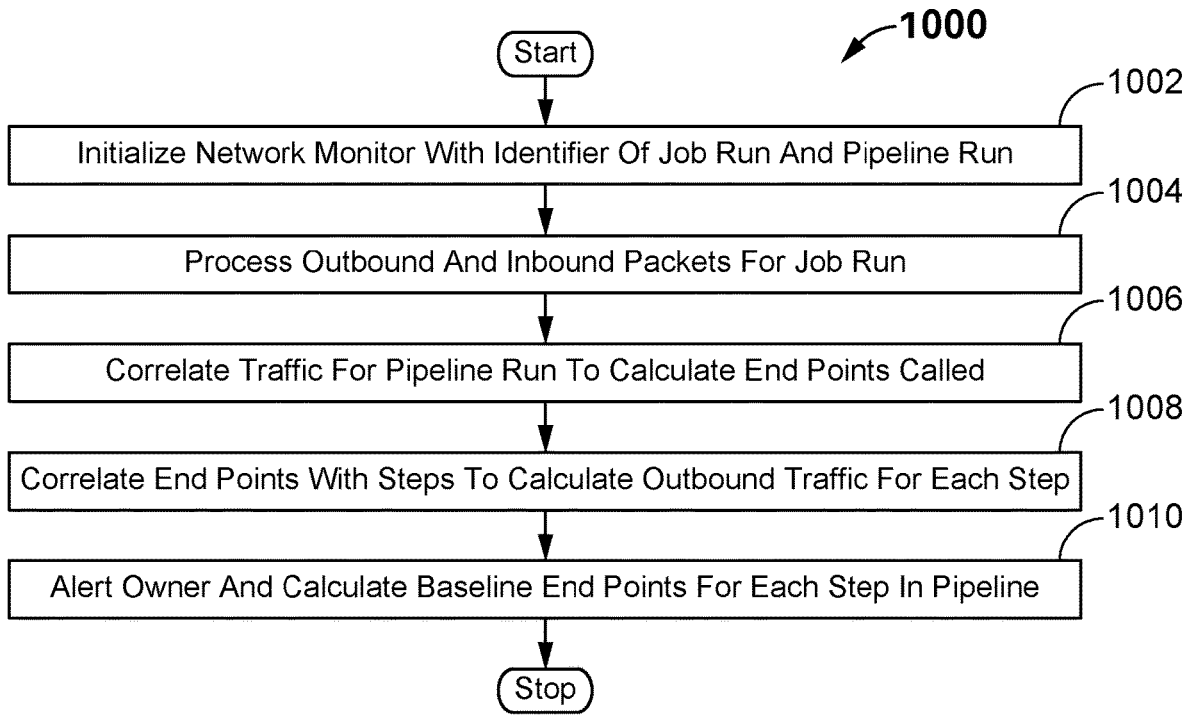
FIG. 10A is a diagram illustrating an embodiment of a single flowchart that depicts the overall working of the software.

FIG. 10A illustrates an embodiment of a single flowchart that depicts the overall working of the software. Step 1002 initializes the network monitor (e.g., network monitor 214 of FIG. 2A or client-based monitor 228 of FIG. 2B) with the identifier of the job run, such as 208-23, and the identifier of the pipeline run, such as 206-23. Process 1100 of FIG. 11 describes this step in more detail. Step 1004 processes outbound and inbound network packets sent by the runner host (302 of FIG. 3) executing the job run 208-23 of job 208. Process 1200 of FIG. 12A, process 1300 of FIG. 13, and process 1400 of FIG. 14 describe this step in more detail. Step 1006 correlates the DNS table and network connections table for a pipeline run, such as 206-23, to calculate list of outbound endpoints ({domain name, port} and {direct IP address, port} pairs) called during the pipeline run 206-23. Process 1500 of FIG. 15 describes this step in more detail. Step 1008 correlates the endpoints ({domain name, port} and {direct IP address, port} pairs) called during the pipeline run 206-23 with each step, such as STEP-1, of each job run, such as 208-23 of a pipeline run. Process 1600 of FIG. 16 describes this step in more detail. Step 1010 alerts the owner of new endpoints called in a step relative to the baseline for that step in the pipeline and updates the baseline outbound traffic of the pipeline based on endpoints accepted as valid by the owner. Process 1700 of FIG. 17 describes this step in more detail.

Figure 10B:
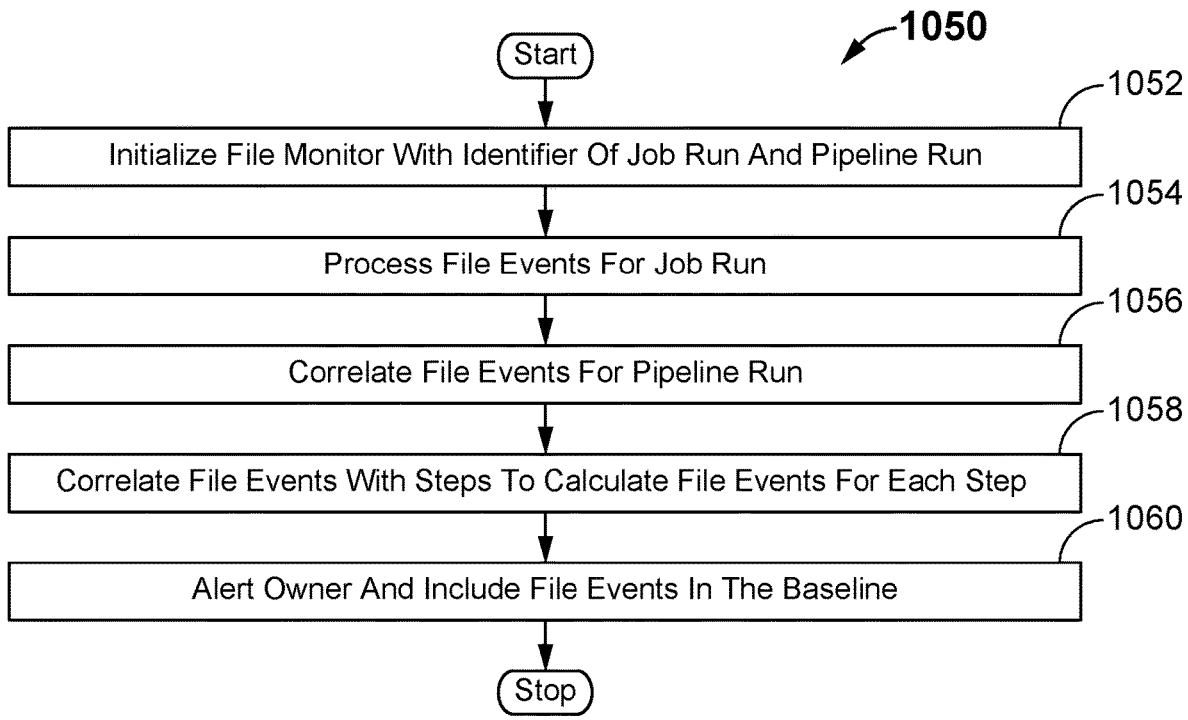
FIG. 10B is a flowchart illustrating the systematic processing of file events.

FIG. 10B is a flowchart of a process 1050 illustrating the systematic processing of file events. At Step 1052, file monitoring is initialized with identifier of job run and pipeline run. At Step 1054, the process 1050 processes file events specific to the job run. At step 1056, the process 1050 correlates file events for pipeline run. At step 1058, the process 1050 correlates file events with steps to calculate file events for each step. At step 1060, the process 1050 alerts owner and include file events in the baseline.

Figure 11:
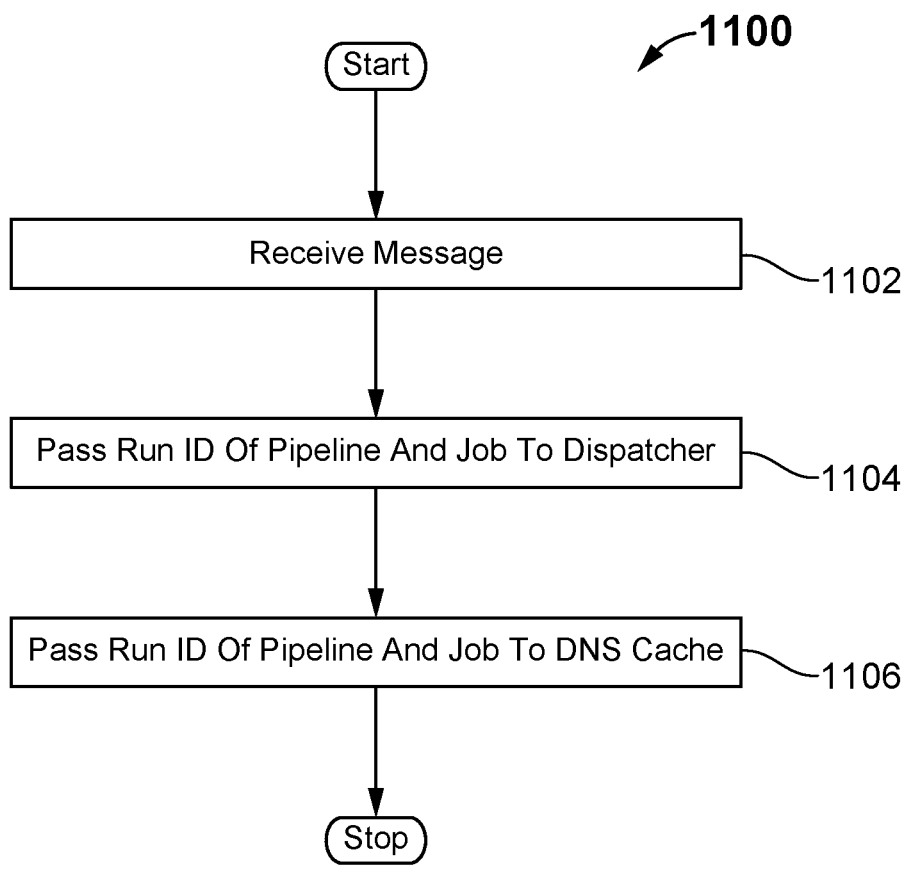
FIG. 11 is a diagram illustrating an embodiment of a process used to initialize the dispatcher and DNS cache of a network monitor.

FIG. 11 illustrates an embodiment of a process used to initialize the dispatcher and DNS cache of a network monitor (e.g., network monitor 214 of FIG. 2A or client-based monitor 228 of FIG. 2B). In some embodiments, process 1100 is performed by the runner application 226, or another application on the runner host, each time a new job, such as job 206 is downloaded and executed by the runner application. In some embodiments, process 1100 is performed by a step of the job, such as STEP-1 of job 208. At 1102 a message is received with the identifier of the job run, such as 208-23, and the identifier of the pipeline run, such as 206-23, from the CI/CD Server 210. Step 1104 sends the identifier of the job run 208-23 and identifier of the pipeline run 206-23 to the dispatcher (308 of FIG. 3) to be used in process 1200 to process outbound packets sent by the steps of job 208 during its job run 208-23. Step 1106 sends the identifier of the job run 208-23 and identifier of the pipeline run 206-23 to the DNS cache (310 of FIG. 3) to be used in process 1400 of FIG. 14, and then the process ends.

Figure 12A:
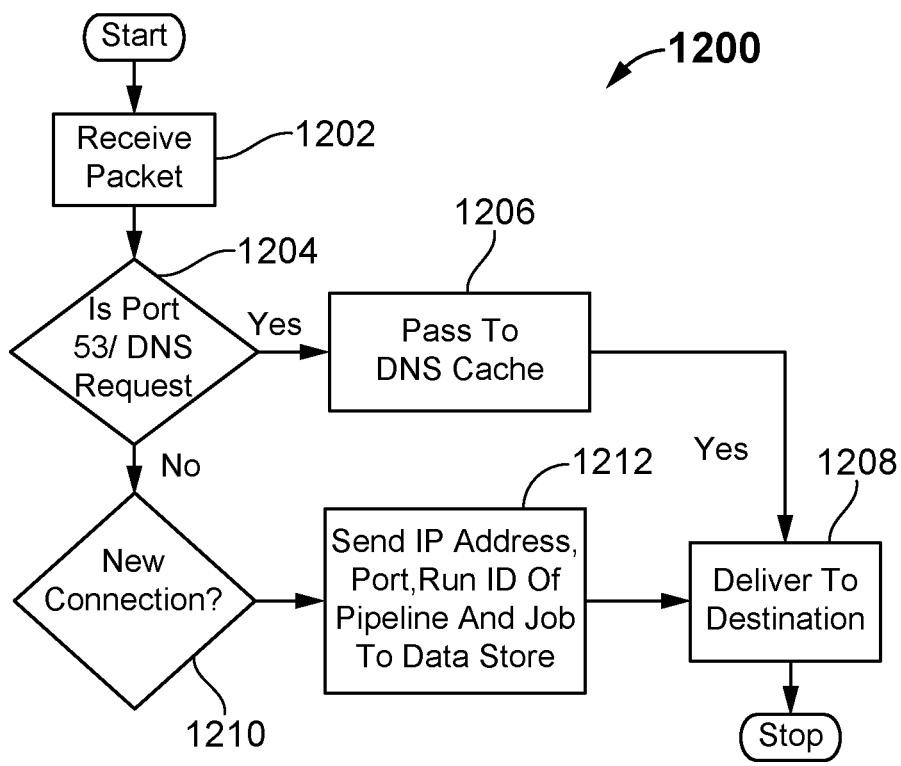
FIG. 12A is a diagram illustrating an embodiment of a process used to process an outbound packet from a runner host.

FIG. 12A illustrates an embodiment of a process used to process an outbound packet from a runner host, such as runner host 302 of FIG. 3. In some embodiments, process 1200 is performed by dispatcher 308 of FIG. 3 each time an outbound packet is received from a runner host, such as runner host 302. Before process 1200 starts, the dispatcher 310 of FIG. 3 has been initialized with the identifier of the job run 208-23 and the identifier of the pipeline run 206-23 by process 1100. At 1202, a packet is received from a runner host in a network. In some embodiments, 1202 includes decoding the received packet.

It is determined at 1204 whether the destination port is port 53, which corresponds to a connection with a DNS server. If it is determined at 1204 that the destination port of the packet is port 53 (e.g., the packet corresponds to a DNS request), the packet (or a copy thereof) is passed at 1206 to a DNS cache. At 1208, the packet is delivered or allowed to be delivered to its destination, and then the process ends. If at 1204 the packet is not a DNS request, step 1210 checks if the packet is for a new connection, e.g. that it is a TCP SYN packet. If yes, step 1212 sends the {destination IP address, destination port} along with the identifier of the job run 208-23, the identifier of the pipeline run 206-23, and timestamp to be stored at the data store 222 in the network connections table of FIG. 5. The packet is delivered or allowed to be delivered to its destination at 1208, and the process ends.

Figure 12B:
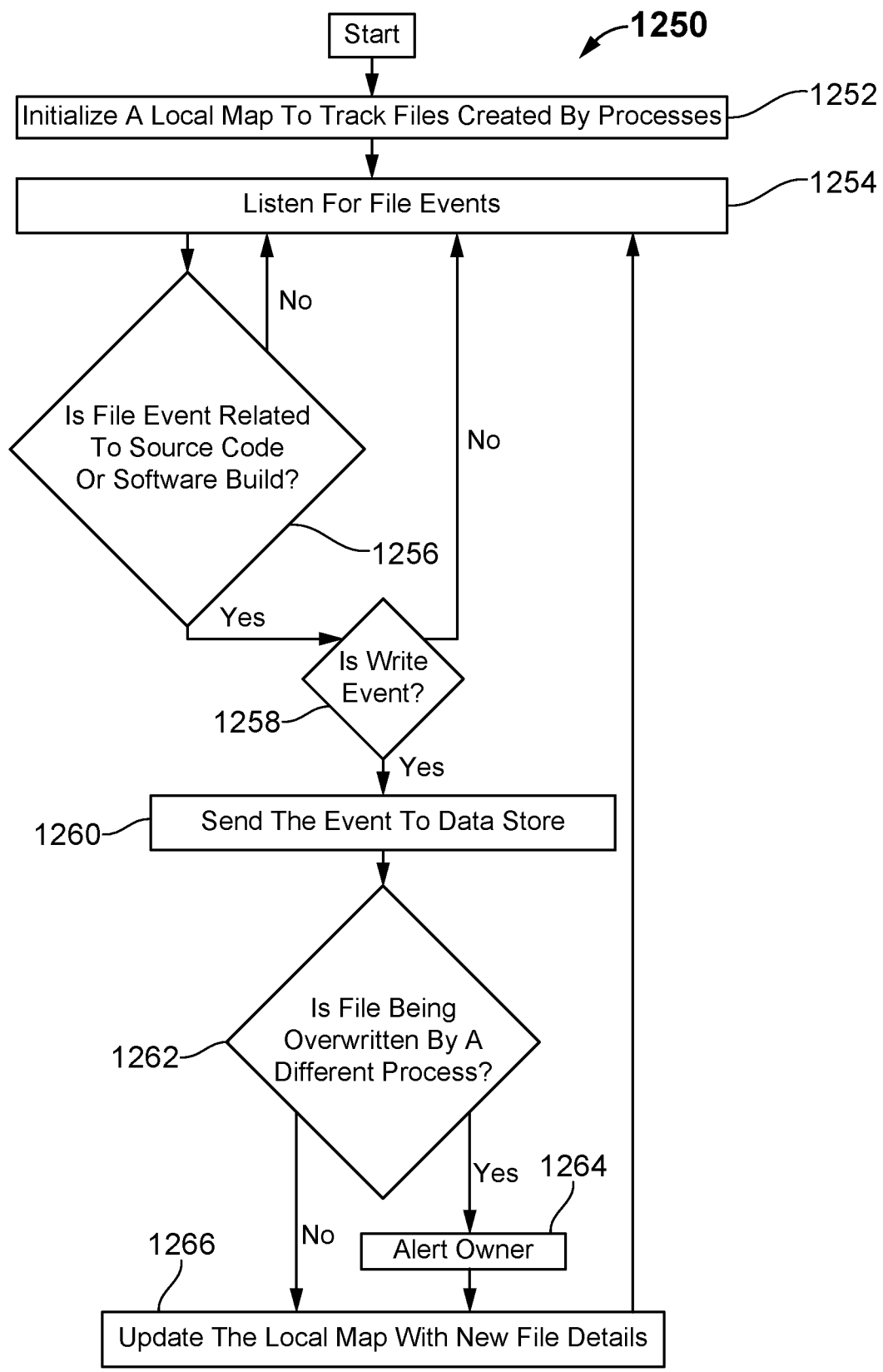
FIG. 12B is a diagram illustrating an embodiment for processing file events.

FIG. 12B is a diagram illustrating an embodiment of a process 1250 for processing of file events. At step 1252, a local map is initialized to track files created by processes. At step 1254, the process 1250 actively monitors and captures file events. At step 1256, the process 1250 checks if file event is related to source code or software build. At step 1258, if file event is related to source code or software build, the process 1250 checks if file system events is write event. At step 1260, if it is write event, the event are sent to the data store. At step 1262, the process 1250 checks if the file being overwritten by a different process. At step 1264, if the file is overwritten by a different process, alerts are sent to the owner. At step 1264, if the file is not being overwritten by a different process, the local map is updated with new file details. The process 1250 returns to step 1254.

Figure 13:
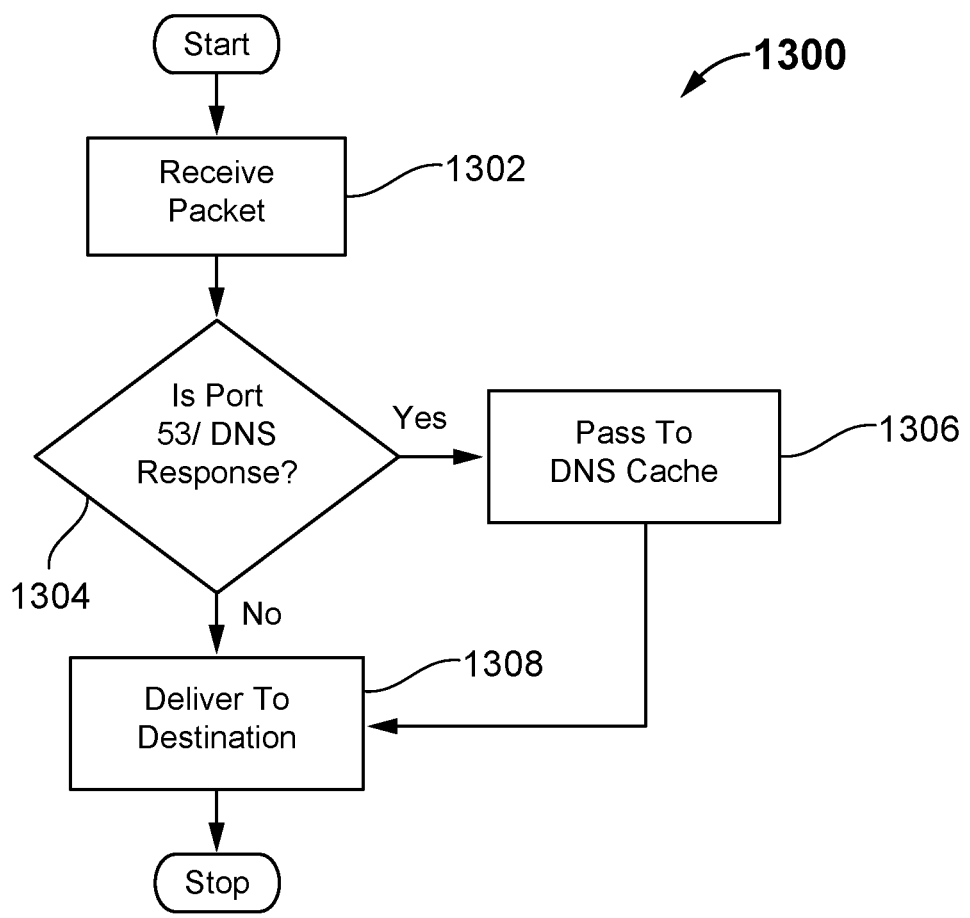
FIG. 13 is a diagram illustrating an embodiment of a process used to process an inbound packet received from an external host.

FIG. 13 illustrates an embodiment of a process used to process an inbound packet received from an external host, such as external host 314 of FIG. 3. In some embodiments, process 1300 is employed by dispatcher 308 of FIG. 3. At 1302, a packet is received from an external host via an external network. In some embodiments, 1302 includes decoding the received packet. It is determined at 1304 whether the source port of the packet received at 1302 is port 53, which corresponds to a DNS transmission. If it is determined at 1304 that the source port of the packet received at 1302 is port 53 (e.g., the packet corresponds to a DNS response), the packet 5 (or a copy thereof) is passed to a DNS cache (e.g., 312 of FIG. 3) at 1306 prior to being delivered (or allowed to be delivered) at 1308 to its destination, e.g., a runner host in the network that issued a DNS request, the response of which corresponds to the packet received at 1302. If it is determined at 1304 that the source port of the packet received at 1302 is not port 53, the packet is delivered (or allowed to be delivered) to its destination at 1308 and the process ends.

Figure 14:
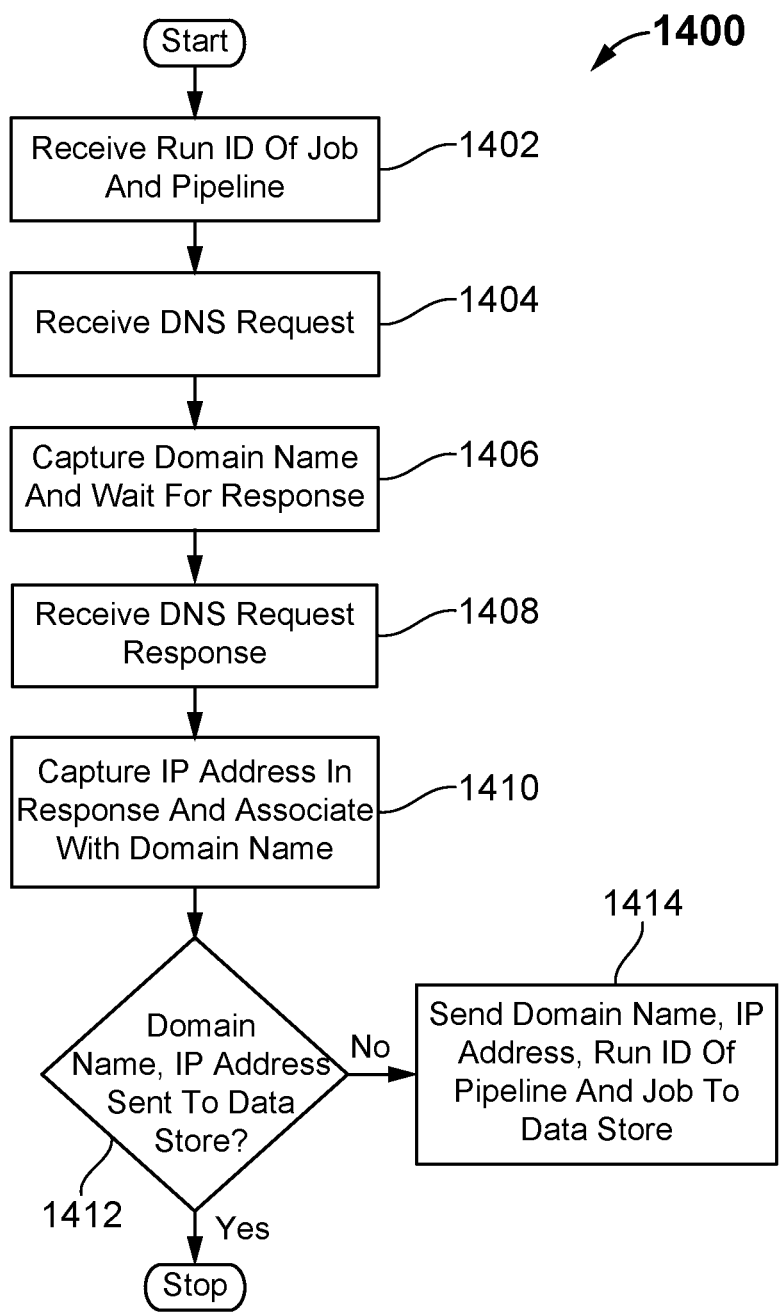
FIG. 14 is a diagram illustrating an embodiment of a process to send information about domains resolved during the run of a job to the data store.

FIG. 14 illustrates an embodiment of a process used to send information about domains resolved during the run of a job to the data store. Process 1400 is used by DNS cache 310 of FIG. 3. At 1402 the DNS cache is initialized with the identifier of the job run 208-23 and the identifier of the pipeline run 206-23 by process 1100. At 1404, a DNS request is received from a runner host, such as host 302 of FIG. 3. In some embodiments, at 1404 the DNS cache receives the request from a dispatcher such as dispatcher 308 of FIG. 3. At 1406, the domain name of the DNS request received at 1404 is captured and stored, and a response from a DNS server to the DNS request of 1404 is awaited. At 1408, a response with IP address associated with the DNS request received at 1404 is received from the DNS server. At 1410, the IP address received at 1408 is associated with the domain name stored at 1406. Step 1412 checks if this {domain name, IP address} pair has already been sent to the data store 222 for this job run 208-23. If not, step 1414 sends the domain name, IP address, identifier of the job run, such as 208-23, identifier of the pipeline run, such as 206-23 to the data store 222 to be stored in the DNS table of FIG. 4, and then the process ends.

Figure 15:
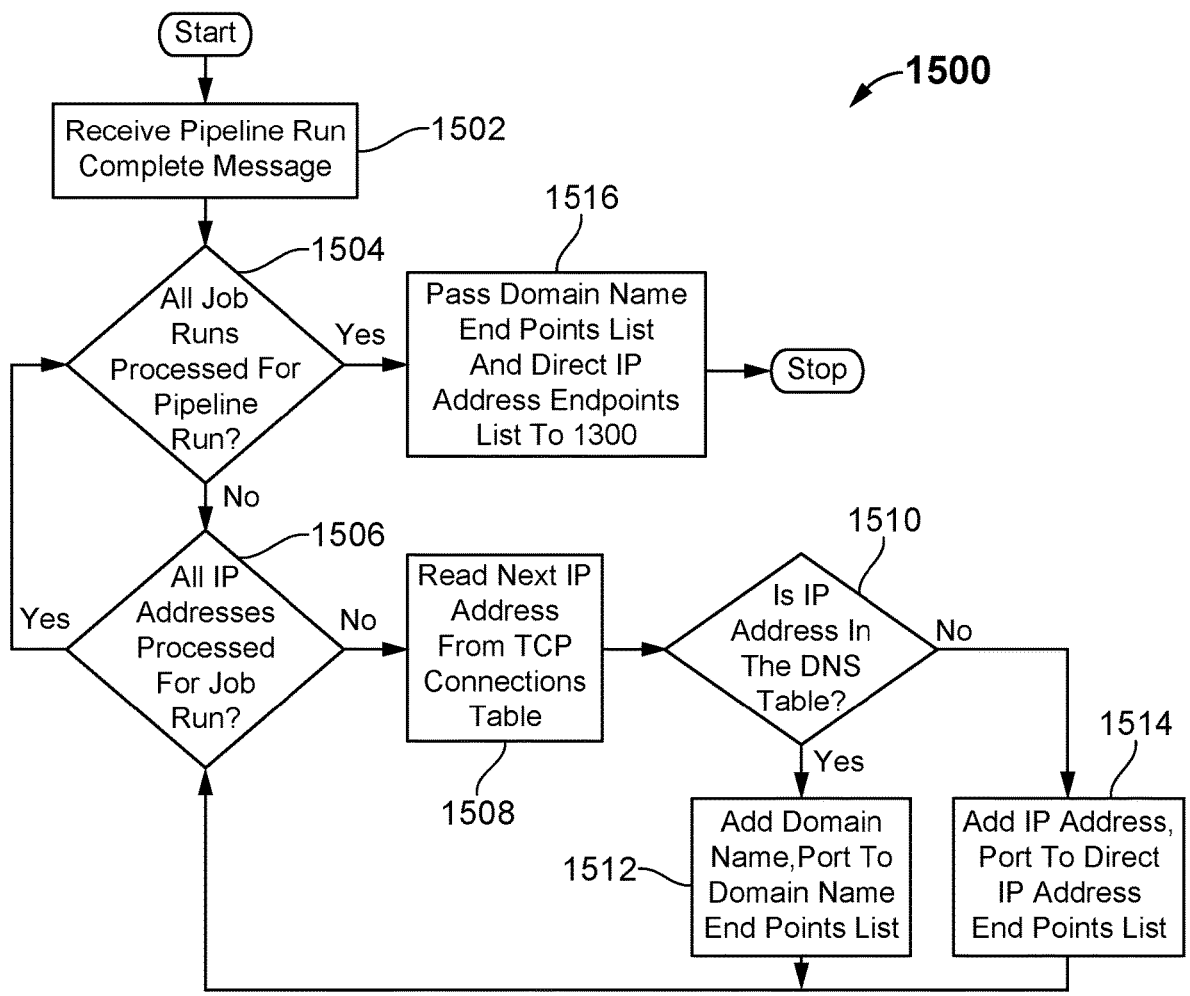
FIG. 15 is a diagram illustrating an embodiment of a process used to calculate list of outbound endpoints called by a pipeline run.

FIG. 15 illustrates an embodiment of a process used to calculate list of outbound endpoints called by the pipeline run. Process 1500 is performed by the correlation server 224. At 1502, a message is received from the CI/CD server 210 that a pipeline run has completed. This includes a list of the identifiers of the job runs, such as 208-23, for each job in the pipeline. In some embodiments, at 1502 correlation server 224 checks with the CI/CD server 210 periodically if a pipeline run has finished running. If so, it gets the list of job run identifiers, such as 208-23, for that pipeline run 206-23.

At 1504 it is checked if all the job run identifiers, such as 208-23, have been processed for the pipeline run 206-23. If not, at 1506, for the next job run identifier for the pipeline run, it is checked if all the entries in the network connections table of FIG. 5 have been processed. If not, at 1508, the next entry is read from the network connections table and the data for the PIPELINE RUN ID, JOB RUN ID, PORT, AND TIMESTAMP columns are copied over to create a new entry in the endpoints table of FIG. 6. At 1510, it is checked if the IP address in the IP ADDRESS column in the entry being processed from the network connections table of FIG. 5 is in the RESOLVED IP ADDRESS column of the DNS table of FIG. 4 for the same job run identifier. If yes, at 1512, the domain name from the DOMAIN NAME column for the matching record from the DNS table of FIG. 4 is copied over to the DOMAIN NAME column for the new entry created in endpoints table of FIG. 6. If at 1510, IP address is not in the RESOLVED IP ADDRESS column of the DNS table of FIG. 4, at 1514, the IP address from the IP ADDRESS column from the network connections table of FIG. 5 is copied over to the DIRECT IP ADDRESS column for the new entry created in endpoints table of FIG. 6.

If at 1506 all entries in the network connections table for the job run identifier have not been processed, the process returns to 1504. If at 1504 all job run identifiers for the pipeline run have been processed, at 1516 the process passes the entries created in the endpoints table for the pipeline run to process 1600 and stops.

Figure 16:
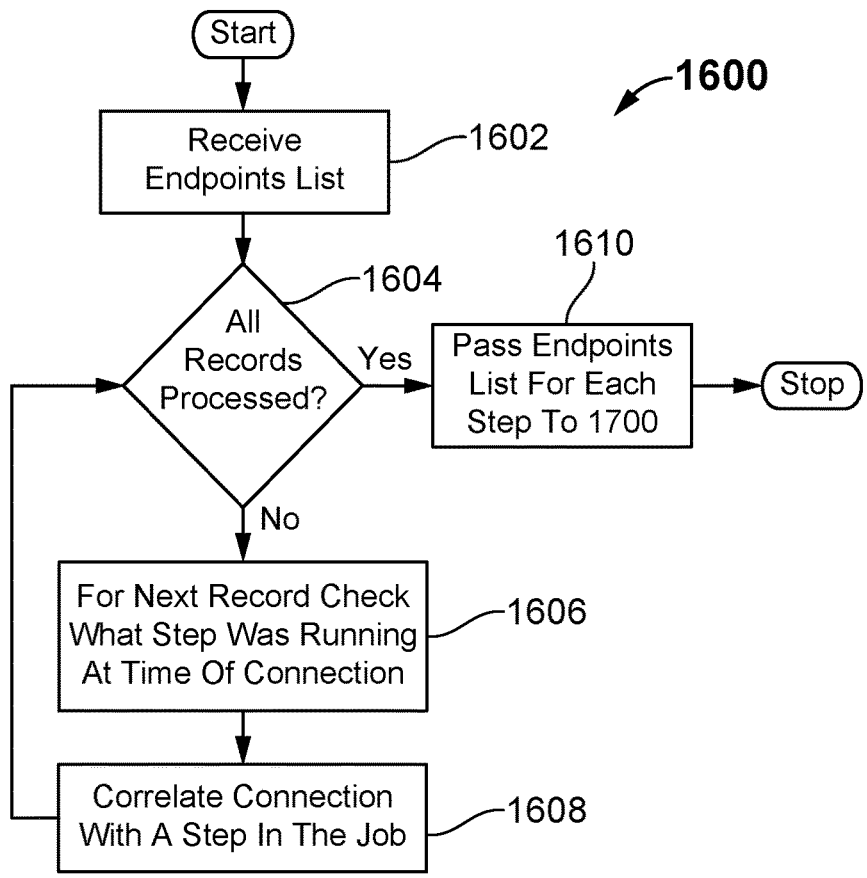
FIG. 16 is a diagram illustrating an embodiment of a process used to correlate the outbound endpoints called in a pipeline run with each step of the pipeline run.

FIG. 16 illustrates an embodiment of a process used to correlate the outbound endpoints called in a pipeline run with each step of the pipeline run. Process 1600 is performed by the correlation server 224. At 1602 a message is received with outbound endpoints called for each job run such as run 208-23 of the pipeline run along with the timestamp of when the connection was established. This is the list described in the endpoints table of FIG. 6 passed by process 1500. Step 1604 retrieves information about the steps that were run in the pipeline run 206-23. This information can be fetched from the CI/CD Server 210, example from the build logs. In some embodiments the runner application 226 may store this information in a data store, and it can be fetched from there. The data returned is described in the step table of FIG. 7. Step 1606 checks if each of the entries in the endpoints table received at 1602 have been processed. If not, step 1608 processes the next entry. For the next entry in the endpoints table received at 1602, step 1608 copies over the data from the PIPELINE RUN ID, JOB RUN ID, DOMAIN NAME, DIRECT IP ADDRESS, PORT and TIMESTAMP columns to create a new entry in the step endpoints table of FIG. 8. Step 1608 then looks up the data in the TIMESTAMP column of the entry being processed and checks what step was running at the time the connection was made by checking if the time in the TIMESTAMP column is between the time in the START TIME and END TIME columns for each step for the job run in the step table of FIG. 7. Step 1608 then copies over the step name from the STEP NAME column for the matching step to the STEP NAME column of the step endpoints table of FIG. 8. This completes processing of the current entry in the endpoints table. 1610 then returns to 1606 to check if all the entries in the endpoints table are processed. If yes, step 1612 stores this step-endpoints correlation in the step endpoints table of FIG. 9 in the data store 222 and sends this information to process 1700 of FIG. 17 and stops.

Figure 17:
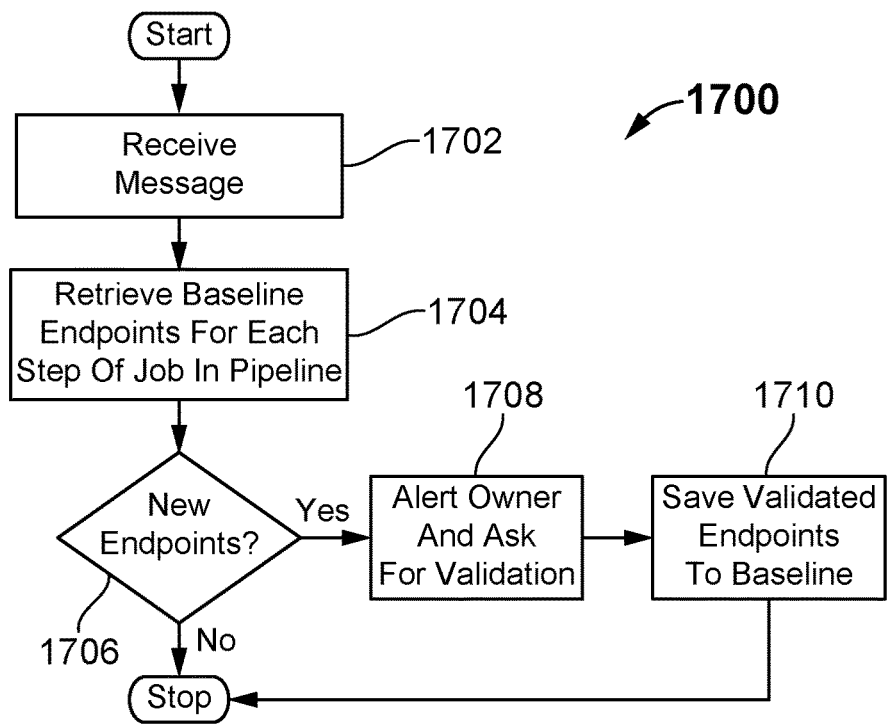
FIG. 17 is a diagram illustrating an embodiment of a process used to correlate the endpoints for each step in a pipeline run with the baseline endpoints for the pipeline.

FIG. 17 illustrates an embodiment of a process used to correlate the endpoints for each step in a pipeline run with the baseline endpoints for the pipeline. Process 1700 is performed by the correlation server 224. At 1702, list of outbound endpoints ({domain name, port} and {direct IP address, port} pairs) for each step of each job for the pipeline run 206-23 are received from process 1600 as described in step endpoints table of FIG. 8. At 1704, list of baseline endpoints for each step of the job, such as job 208, in the pipeline, such as pipeline 206, are retrieved from the baseline table of FIG. 9 from the data store 222. At 1706, the endpoints retrieved in 1704 are compared with the endpoints received in 1702. For each entry in the step endpoints table received at 1702, it is checked if the domain name from the DOMAIN NAME column or the IP address from the DIRECT IP ADDRESS column for the step in the STEP NAME column is present in any of the entries in the baseline table of FIG. 9 for the job and pipeline whose run is being processed. If an entry is not present, it means there are new endpoints that were called by that step in the current pipeline run. If so, at 1708 an alert is sent to the owner of the pipeline and the owner is asked to validate the new endpoints. At 1710, the validated endpoints are added to the baseline table of FIG. 9. For each new endpoint, a new entry is created in the baseline table of FIG. 9. The pipeline 206 associated with the PIPELINE RUN ID 206-23 in the step endpoints table is inserted into the PIPELINE column in the baseline table. The job 208 associated with JOB RUN ID 208-23 in the step endpoints table is inserted into the JOB column in the baseline table. The data from the STEP NAME, DOMAIN NAME, DIRECT IP ADDRESS, AND PORT columns is copied over as-is to the new entry in the baseline table of FIG. 9. Once all the new endpoints that are validated are added to the baseline table, the process stops.

Figure 18:
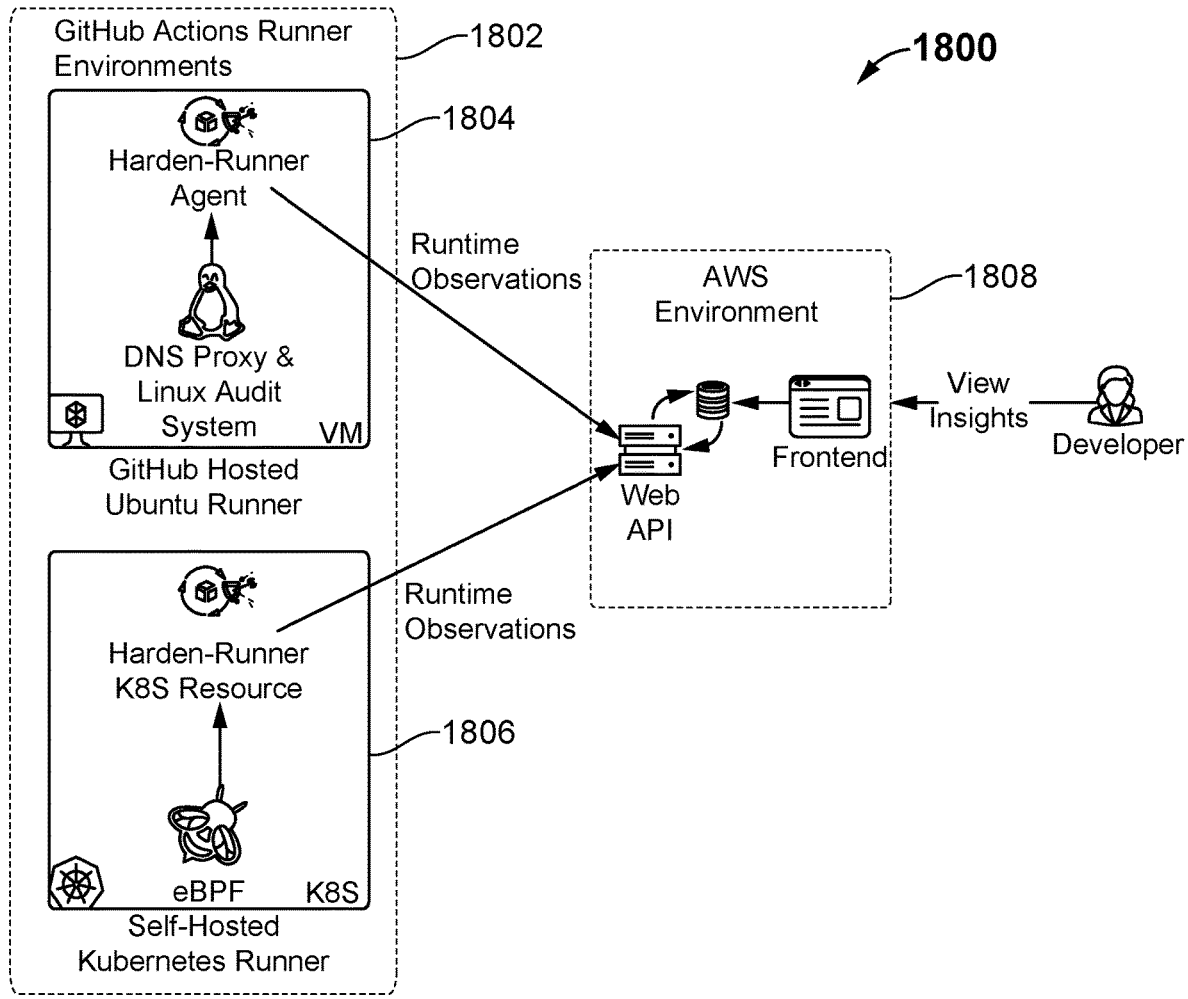
FIG. 18 is a diagram illustrating an embodiment of a system providing insights for GitHub Actions Runner Environments.

FIG. 18 is a diagram illustrating an embodiment 1800 of a system providing insights for GitHub Actions Runner Environments 1802. An AWS environment 1808 contains a web API and a front-end system, for interaction or access. The GitHub Actions Runner Environments 1802 signifies the environment where GitHub Actions runners operate. These runners are connected to the AWS environment 1808. The runners include GitHub Hosted Ubuntu Runner 1804 and Self-Hosted Kubernetes Runner 1806.

The GitHub Hosted Ubuntu Runner 1804 includes components such as a Harden-Runner Agent, responsible for enhancing the security of the runner environment, and a DNS Proxy & Linux Audit System, which manages DNS requests and perform auditing on the Linux system. The self-hosted kubernetes runner 1806 includes the Harden-Runner K8S Resource and eBPF. It includes security measures specific to Kubernetes, focused on securing Kubernetes resources and using eBPF (extended Berkeley Packet Filter) for monitoring and security purposes. The GitHub Actions Runner Environments 1802 send runtime observations (likely data related to execution, processes, or events) to the AWS environment 1808. The AWS environment 1808 processes this data and provides insights, potentially related to security analysis, observations, or reports derived from the runtime data received from these environments.

Figure 19:
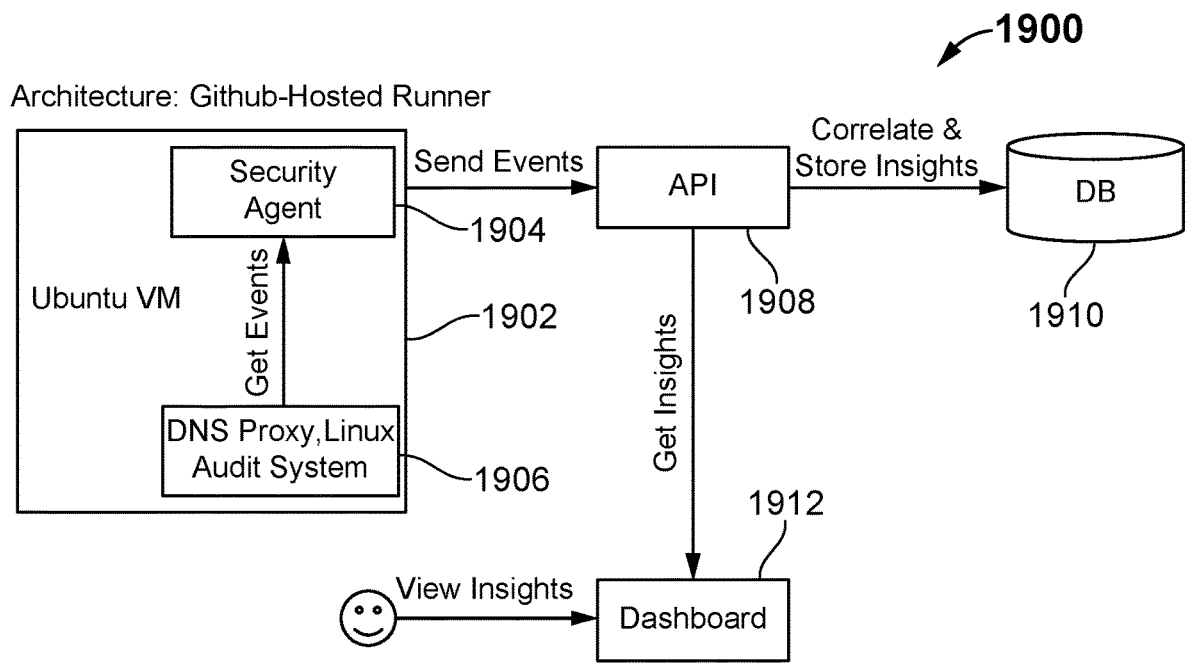
FIG. 19 is a diagram illustrating an embodiment of a system providing insights for Github-hosted Runner.

FIG. 19 is a diagram illustrating an embodiment 1900 of a system providing insights for Github-hosted Runner. The GitHub-hosted Runner environment consists of an Ubuntu virtual machine (VM) 1902 equipped with a security agent 1904, a DNS Proxy, and a Linux Audit System 1906. Within the GitHub-hosted Runner, the security agent 1904 interacts with the Linux Audit System 1906. The Audit System 1906 generates events related to security observations or activities within the Ubuntu VM 1902, which are then received by the security agent 1904. The security agent 1904, upon receiving these events from the Audit System 1906, transmits them to the API 1908. The API 1908 serves as an intermediary or endpoint for collecting and processing security-related events or data. The API 1908 performs correlation and storage tasks with the received events. It correlates the events, for patterns or relationships, and then stores these insights or processed data in the DB 1910. The dashboard 1912 receives these insights or processed data from the DB 1910. This dashboard 1912 provides a user-friendly interface for users or administrators to view, analyze, or monitor the security-related insights derived from the events collected and processed by the system.

Figure 20:
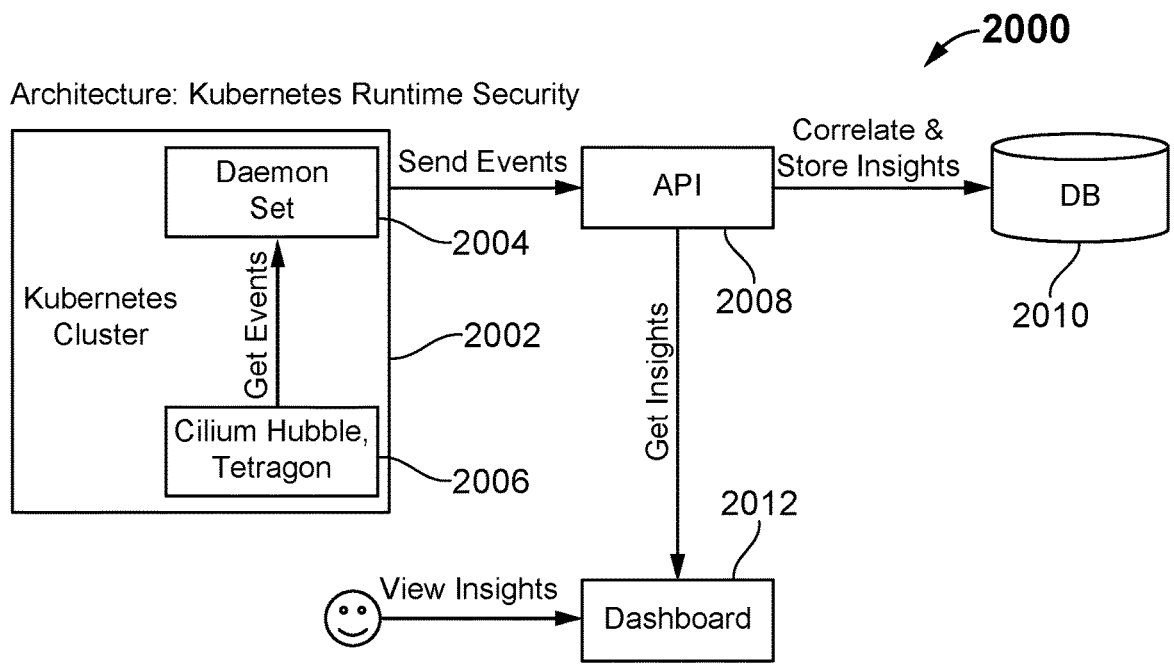
FIG. 20 is a diagram illustrating an embodiment of a system providing insights for Kubernetes runner environment.

FIG. 20 is a diagram illustrating an embodiment 2000 of a system providing insights for Kubernetes runner environment. The Kubernetes Runtime Security environment ensures security within a Kubernetes Cluster 2002 environment. Within the Kubernetes Cluster 2002, there are specific elements including Cilium Hubble and Tetragon 2006 and daemon set 2004. It consists of security measures or modules designed to enhance security within the Kubernetes environment. The daemon set 2004, operating within Cilium Hubble and Tetragon 2006, gathers security-related events or observations within the Kubernetes Cluster 2002. These events are collected and then transmitted to the API 2008. The API 2008 serves as a central interface or endpoint for receiving and managing security-related events from various sources within the Kubernetes Cluster 2002. The API 2008 processes these received events, by performing correlation or analysis to derive insights or patterns. Subsequently, the API 2008 stores the insights or processed data in the DB 2010 for future reference or analysis. The dashboard 2012 receives the stored insights or processed data from the DB 2010. The dashboard 2012 serves as an interface for users or administrators to visualize and monitor the security-related insights derived from the events collected and processed within the Kubernetes Runtime Security system.

In one embodiment, the present invention discloses a contextualized runtime security system for safeguarding continuous integration (CI)/continuous deployment (CD) systems. The system comprises a plurality of interconnected nodes, and a continuous integration (CI)/continuous deployment (CD) server connected to the nodes. The nodes and server are configured to perform one or more operations including: receive runtime event data of one or more pipelines in a CI/CD environment, from the sensors; map each event with a respective step of respective pipeline; generate a Software Bill of Materials (SBOM) based on the identified third-party components utilized in runtime event data; identify historical CI/CD security attack patterns utilizing the received runtime event data; create a baseline of expected runtime behaviour and compare runtime behaviors of the runtime event data against the established baselines, and block deviations from anticipated runtime baselines derived from prior pipeline runs.

The runtime event data includes job run in the pipeline run. The operations further include: calculate a list of outbound endpoints called during the pipeline run; receive information about steps executed for each of the job runs in the pipeline run; correlate the endpoints called during each job run of the pipeline run with each of the steps; compare the endpoints for each job run in the current pipeline run with baseline outbound endpoints for each job, and alert the owner of the pipeline, on determination of new endpoints relative to the baseline or if the baseline is empty.

The server is further enabled to modify endpoints to match for a different environment. The server is further configured to provide insights on runtime events before the pipeline run. The server is further enables to create a policy to block deviations from the expected runtime baseline derived using prior pipeline runs. The server is further configured to intercept and analyze outbound HTTP/HTTPS requests from pipelines. The server is further configured to confine outbound traffic to specific paths, verbs, or endpoints based on intercepted request details, which is detailly explained as follows.

The system offers robust capabilities in detecting specific details of outbound calls made from CI/CD pipelines, including the identification of the precise HTTP verb, path, and request body. In instances where HTTPS is utilized for outbound calls within CI/CD pipelines, the system actively or passively intercepts these HTTPS requests and decrypts them for thorough analysis. This gathered information serves two primary purposes: including refined traffic restriction and token permission calculations.

The system facilitates the restriction of outbound traffic, extending beyond particular endpoints to specific paths and verbs. This functionality proves valuable in controlling traffic, especially towards widely used multi-tenant web domains like api.github.com, s3.us-east-2.amazonaws.com, among others.

Further, for leveraging details from HTTP outbound requests, the system computes the minimum token permissions necessary (least privileged token permissions) for accessing a designated endpoint. For example, it determines the minimum GitHub Actions token permission required for a specified CI/CD workflow or a commonly used third-party/open-source CI/CD step, such as actions/checkout. The system maps the HTTP/HTTPS request precisely back to the specific CI/CD step that initiated the request, facilitated by the contextualized observability feature mentioned earlier.

The CI/CD environment is inherently high in privileges, typically holding critical secrets such as administrative cloud credentials and generating production builds. Furthermore, it executes untrusted third-party code within this privileged space, thereby elevating the associated risk significantly. The system stands as a defense mechanism aimed at safeguarding against the increasingly prevalent CI/CD security attacks.

The present invention further discloses a method for safeguarding continuous integration (CI)/continuous deployment (CD) systems. The method is executed in a system comprising a plurality of interconnected nodes, and a continuous integration (CI)/continuous deployment (CD) server connected to the nodes. The method comprising the steps of: receiving runtime event data of one or more pipelines in a CI/CD environment, from one or more sensors; mapping each event with a respective step of respective pipeline; generating a Software Bill of Materials (SBOM) based on the identified third-party components utilized in runtime event data; identifying historical CI/CD security attack patterns utilizing the received runtime event data; creating a baseline of expected runtime behaviour and compare runtime behaviors of the runtime event data against the established baselines, and blocking deviations from anticipated runtime baselines derived from prior pipeline runs. In another embodiment, if an owner has explicitly defined the list of allowed endpoints in the pipeline file, unexpected endpoints are blocked. In addition, the correlation server correlates file events established by each job run to calculate file events generated by each step. This information is used to detect suspicious file and software build overwrite events to detect software supply chain attacks. Observed file and outbound network events can be used by the system to generate Software Bill of Materials (SBOM) using runtime events.

The runtime event data includes job run in the pipeline run. The method further comprising steps of: calculating a list of outbound endpoints called during the pipeline run; receiving information about steps executed for each of the job runs in the pipeline run; correlating the endpoints called during each job run of the pipeline run with each of the steps; comparing the endpoints for each job run in the current pipeline run with baseline outbound endpoints for each job, and alerting the owner of the pipeline, on determination of new endpoints relative to the baseline or if the baseline is empty. The method further comprising the step of: enabling to modify endpoints to match for a different environment. The method further comprising the step of: providing insights on runtime events before the pipeline run. The method further comprising the step of: enabling to create a policy to block deviations from the expected runtime baseline derived using prior pipeline runs. The method further comprising the step of: intercepting and analyzing outbound HTTP/HTTPS requests from the pipelines. The method further comprising the step of: confining outbound traffic to specific paths, verbs, or endpoints based on intercepted request details.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

It will be appreciated by those skilled in the art that other various modifications could be made to the system, process, and methods of use without parting from the spirit of the scope of this disclosure. All such modifications and changes fall within the scope of the specification, herein, and the claims and are intended to be covered thereby.

What is claimed is:

1. A contextualized runtime security computer system for safeguarding continuous integration (CI)/continuous deployment (CD) systems, the computer system comprising:
a plurality of interconnected nodes; and
a continuous integration (CI)/continuous deployment (CD) server implemented in special purpose hardware and having memory storing computer instructions, wherein the CI/CD server is connected to one or more nodes of the plurality of interconnected nodes, wherein the plurality of interconnected nodes and server are configured to perform one or more operations including:
receive runtime event data for one or more events, including data generated by job runs that are performed when one or more pipelines are run in a CI/CD environment, the runtime event data being received from sensors deployed with the CI/CD environment;
map each of the one or more events with a respective step of a respective pipeline of the one or more pipelines;
generate a Software Bill of Materials (SBOM) based on an identified third-party component inferred from the runtime event data;
identify historical CI/CD security attack patterns utilizing the received runtime event data;
create a baseline of expected runtime behavior based on prior runtime event data;
compare the current runtime event data against the baseline of expected runtime behavior; and
based at least in part on the comparison of the current runtime event data against the baseline of expected runtime behavior, block deviations from the baseline of expected runtime behavior;
wherein when each of the one or more pipelines is run, perform further operations that include:
calculate multiple outbound endpoints called during one or more job runs of the pipeline;
receive information about a plurality of steps executed with the one or more job runs;
correlate each of the multiple outbound endpoints called during the one or more job runs with one or more steps of the plurality of steps;
compare the multiple outbound endpoints called during the one or more job runs with one or more baseline outbound endpoints of each job run; and
alert an owner of the pipeline, based on a determination of whether there are new endpoints relative to the baseline outbound endpoints.

2. The computer system of claim 1, wherein the server is further enabled to modify outbound endpoints to match for a different environment.

3. The computer system of claim 1, wherein the server is further configured to generate the Software Bill of Materials (SBOM) using runtime event data.

4. The computer system of claim 1, wherein the server is further configured to provide insights on runtime events before the one or more pipelines are run.

5. The computer system of claim 1, wherein the server is further configured to enable a policy to be created to block deviations from the baseline of expected runtime behavior.

6. The computer system of claim 1, wherein the server is further configured to intercept and analyze outbound HTTP/HTTPS requests when the one or more pipelines are run.

7. The computer system of claim 6, wherein the server is further configured to confine outbound traffic to specific paths, verbs, or endpoints based on intercepted request details.

8. A method for safeguarding continuous integration (CI)/continuous deployment (CD) systems, the method executed in a system comprising a plurality of interconnected nodes, and a continuous integration (CI)/continuous deployment (CD) server connected to the nodes, the method comprising the steps of:
- receiving runtime event data for one or more events, including data generated by job runs that are performed when one or more pipelines are run in a CI/CD environment, the runtime event data being received from sensors deployed with the CI/CD environment;
- mapping each of the one or more events event with a respective step of a respective pipeline of the one or more pipelines;
- generating a Software Bill of Materials (SBOM) based on an identified third-party component inferred from the runtime event data;
- identifying historical CI/CD security attack patterns utilizing the received runtime event data;
- creating a baseline of expected runtime behavior based on prior runtime event data; and
- comparing the current runtime event data against the baseline of expected runtime behavior; and
- based at least in part on the comparison of the current runtime event data against the baseline of expected runtime behavior, blocking deviations from the baseline of expected runtime behavior;
- wherein when each of the one or more pipelines is run, the method includes:
- calculating multiple outbound endpoints called during one or more job runs of the pipeline run;
- receiving information about a plurality of steps executed with the one or more job runs;
- correlating each of the multiple outbound endpoints called during the one or more job runs with one or more steps of the plurality of steps;
- comparing the multiple outbound endpoints called during the one or more job runs with one or more baseline outbound endpoints of each job run; and
- alerting an owner of the pipeline, based on a determination of whether there are new endpoints relative to the baseline outbound endpoints.

9. The method of claim 8, further comprising the step of: generating the Software Bill of Materials (SBOM) using runtime event data.

10. The method of claim 9, wherein the method further comprises the step of:
- correlating file events established by each job run to calculate file events generated by each step;
- based on the calculated file events generated by each step, detecting suspicious file and software build overwrite events; and
- based on the detected events, generating the Software Bill of Materials (SBOM).

11. The method of claim 8, further comprising the step of: enabling to modify outbound endpoints to match for a different environment.

12. The method of claim 8, further comprising the step of: providing insights on runtime events before the one or more pipelines are run.

13. The method of claim 8, further comprising the step of: enabling a policy to be created block deviations from the baseline of expected runtime behavior.

14. The method of claim 8, further comprising the step of: intercepting and analyzing outbound HTTP/HTTPS requests when the one or more pipelines are run.

15. The method of claim 14, further comprising the step of: confining outbound traffic to specific paths, verbs, or endpoints based on intercepted request details.

* * * * *